US012613100B1

(12) United States Patent (10) Patent No.: US 12,613,100 B1

Abdel Rahman et al. (45) Date of Patent: Apr. 28, 2026

(54) METHOD AND SYSTEM OF AMBIGUITY RESOLUTION AND BIAS REDUCTION FOR PERCEPTION AND MAP ASSOCIATION

(71) Applicant: GM GLOBAL TECHNOLOGY OPERATIONS LLC, Detroit, MI (US)

(72) Inventors: Tarek Abdel Raouf Abdel Rahman, Madison Heights, MI (US); Ryan Jay Yergin, Novi, MI (US); Yuan Tian, Troy, MI (US); Prashanta Gyawali, Rochester Hills, MI (US); Brent Navin Roger Bacchus, Sterling Heights, MI (US); Peter Edward LeVasseur, Oviedo, FL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 18/928,723

(22) Filed: Oct. 28, 2024

(51) Int. Cl.
*G01C 21/30* (2006.01)

(52) U.S. Cl.
CPC .................................... *G01C 21/30* (2013.01)

(58) Field of Classification Search
None
See application file for complete search history.

(56) References Cited

U.S. PATENT DOCUMENTS

| | | | | |
|---|---|---|---|---|
| 9,310,804 | B1 * | 4/2016 | Ferguson | .............. G05D 1/0246 |
| 12,515,696 | B2 * | 1/2026 | Zhou | .................... B60W 60/001 |

| | | | | |
|---|---|---|---|---|
| 2017/0336214 | A1 * | 11/2017 | Lynch | .................... G01C 21/34 |
| 2019/0301873 | A1 * | 10/2019 | Prasser | .............. G01C 21/3848 |
| 2022/0319042 | A1 * | 10/2022 | Roth | ........................ G06T 7/246 |
| 2024/0263965 | A1 | 8/2024 | Bacchus et al. | |
| 2024/0385010 | A1 * | 11/2024 | Chen | ...................... G01C 21/32 |
| 2025/0069255 | A1 * | 2/2025 | Peng | .................. G01C 21/3811 |
| 2025/0102320 | A1 * | 3/2025 | Zeng | .................. G01C 21/3867 |
| 2025/0251244 | A1 * | 8/2025 | Niewiadomski | ..... G06V 20/588 |

FOREIGN PATENT DOCUMENTS

| | | | | |
|---|---|---|---|---|
| DE | 102016213782 | A1 | 2/2018 | |
| DE | 102022004633 | A1 | 6/2023 | |
| DE | 102022004774 | A1 | 6/2023 | |
| DE | 102023004673 | A1 | 5/2024 | |
| EP | 4165375 | B1 * | 12/2025 | ........... G06V 20/588 |

* cited by examiner

*Primary Examiner* — Daniel L Greene
(74) *Attorney, Agent, or Firm* — Ingrassia Fisher & Lorenz, LLP | IF&L

(57) ABSTRACT

A method includes receiving map data with a plurality of map lane edges and a plurality of perception lane edges of a roadway segment. The method includes determining a probability score of alignments that each indicate whether at least one of the map lane edges of the alignment is to be a same lane line as one of the perception lane edges of the alignment. The method includes resolving an ambiguity when no probability score of the roadway segment satisfies at least one alignment criterion, and determining a resolved alignment between the perception and map lane edges. This includes applying multiple ambiguity stages each with a different ambiguity test and that determine whether to increment a non-ambiguity count depending on the magnitude of likelihoods related to the alignments. The resolved alignment exists when the alignment between lane edges has a highest non-ambiguity count.

20 Claims, 17 Drawing Sheets

| A | B | C | D |
|---|---|---|---|
| p1 | m1 ✓ | m1 ✓ | m1 |
| p2 | m2 x | m2 ✓ | m2 |
| p3 | m3 x | m3 ✓ | m3 |
| p4 | U x | m4 ✓ | m4 |

METHOD AND SYSTEM OF AMBIGUITY RESOLUTION AND BIAS REDUCTION FOR PERCEPTION AND MAP ASSOCIATION

INTRODUCTION

The present disclosure relates to navigation systems for a vehicle, and particularly to a perception and map edge association for a vehicle.

An autonomous driving system often includes a navigation system for a vehicle and is a complex system that includes many different aspects. For example, an autonomous driving system may include multiple sensors to gather perception data with respect to the vehicle's surrounding environment. In addition to the sensors, the autonomous driving system also uses map data as well. Perception data is matched to map data in association systems to perform the navigation for autonomous driving systems. The present disclosure provides an improved association system.

SUMMARY

In an example implementation, a method includes receiving map data including a plurality of map lane edges of a roadway segment, and receiving perception data including a plurality of perception lane edges of the roadway segment. The method also includes forming at least one alignment having at least one of the map lane edges and at least one of the perception lane edges, and determining, by at least one processor, a probability score of each of the alignments that indicates whether at least one of the map lane edges of the alignment is to be the same lane line as one of the perception lane edges of the alignment. The method includes resolving an ambiguity, by at least one processor, when no probability score of the at least one alignment satisfies at least one alignment criterion, and including determining a resolved alignment between the at least one perception lane edge and the at least one map lane edge including applying multiple ambiguity stages. Each ambiguity stage has a different ambiguity test, and at least two of the ambiguity stages are arranged to determine whether to increment a non-ambiguity count depending on the magnitude of likelihoods related to the at least one alignment. The method includes determining, by at least one processor, the resolved alignment exists when the alignment between the at least one perception lane edge and the at least one map lane edge has a highest non-ambiguity count.

In another example implementation, the alignment is a group alignment with one or more individual alignments, each individual alignment has a perception lane edge paired to a map lane edge, and the multiple ambiguity stages include, in order, a first low likelihood decoupling stage that is arranged to remove individual alignments with low likelihoods, a second ego lane tracking stage that factors previous individual associations between map and perception lane edges, and a third ego lane feature consistency stage that matches lane features of the individual alignments to lane features of the previous individual associations.

In another example implementation, the alignment is a group alignment with one or more individual alignments, each individual alignment has a perception lane edge paired to a map lane edge, and one of the ambiguity stages is a low likelihood decoupling stage that ignores individual alignments each with an individual likelihood that is below an individual alignment ambiguity threshold. The individual alignments are ignored to compute the probability score of a group alignment.

In another example implementation, the roadway segment is a current segment, and one of the ambiguity stages is an ego lane tracking stage that includes generating ambiguity group alignments each with one or more ambiguity individual alignments, and determining whether a current map or perception lane edge of the ambiguity individual alignment is sufficiently similar to a previous map or perception lane edge of a previous segment and of the ambiguity individual alignment. The previous segment is before the current segment.

In another example implementation, the non-ambiguity count is incremented for each of the ego individual alignments with a sufficient match between a current map and perception lane edge with a previous timestamp map and perception lane edge association.

In another example implementation, the roadway segment is a current segment, and one of the ambiguity stages is an ego lane feature consistency stage that determines likelihoods of feature matches between lane line features of a current map or perception lane edge of the current time stamp with a corresponding previous map or perception edge so that each pair of current and previous map and perception lane edges forms an ambiguity individual alignment. The determining of likelihoods of feature matches is repeated for each ambiguity individual alignment of an ambiguity group alignment with multiple ambiguity individual alignments.

In another example implementation, the non-ambiguity count is incremented with each of the ambiguity individual alignments that has multiple features each with a feature match likelihood that is over a feature match threshold.

In another example implementation, the features include at least one of: lane type, lane color, lane curvature, and lane heading.

In another example implementation, distance between perception and map lane edges is not one of the features.

In another example implementation, a system includes memory, processor circuitry forming at least one processor communicatively coupled to the memory and being arranged to operate by: receiving map data including a plurality of map lane edges of a roadway segment, and receiving perception data including a plurality of perception lane edges of the roadway segment. The processor is arranged to operate by forming at least one alignment having at least one of the map lane edges and at least one of the perception lane edges, and determining a probability score of each of the alignments that indicates whether at least one of the map lane edges of the alignment is to be the same lane line as one of the perception lane edges of the alignment. The processor is arranged to operate by resolving an ambiguity when no probability score of the at least one alignment satisfies at least one alignment criterion, and including determining a resolved alignment between the at least one perception lane edge and the at least one map lane edge including applying multiple ambiguity stages. Each ambiguity stage has a different ambiguity test, and at least two of the ambiguity stages are arranged to determine whether to increment a non-ambiguity count depending on the magnitude of likelihoods related to the at least one alignment. The system also is arranged to operate by determining the resolved alignment exists when the alignment between the at least one perception lane edge and the at least one map lane edge has a highest non-ambiguity count.

In another example implementation, the alignment is a group alignment with one or more individual alignments each having a map lane edge paired with a perception lane edge. The at least one processor is arranged to operate by generating multiple alternative group alignments each with individual alignments with differently paired map and perception lane edges from group alignment to group alignment, and generating a probability score for each alternative group alignment.

In another example implementation, the generating of the multiple alternative group alignments includes maintaining map lane edges in an arrangement relative to each other in a map, maintaining perception lane edges in an arrangement relative to each other in a perception image, and moving the map relative to the perception image to change the map and perception lane edge pairs in the individual alignments from group alignment to group alignment.

In another example implementation, the determining of the probability score includes forming a likelihood for each individual alignment including factoring one or more feature match likelihoods of lane line features without factoring distance between map and perception lane edges.

In another example implementation, the probability score factors at least one feature of: lane type, lane color, lane curvature, and lane heading to generate a selected best group alignment. The at least one processor is arranged to operate by determining a bias correction of the selected best group alignment comprising factoring distance between at least one map lane edge and at least one perception lane edge of the selected best group alignment.

In another example implementation, the at least one processor is arranged to operate by applying a confidence value to a likelihood of each individual alignment to generate the probability score of the group alignment.

In another example implementation, the at least one processor is arranged to operate by determining which group alignment among multiple alternative group alignments has a best alignment between map and perception lane edges including determining whether a ratio with two highest probability scores is over a threshold.

In an example implementation, a vehicle includes memory, and processor circuitry forming at least one processor communicatively coupled to the memory and being arranged to operate by: receiving map data including a plurality of map lane edges of a roadway segment, and receiving perception data including a plurality of perception lane edges of the roadway segment The processor is arranged to operate by forming at least one alignment having at least one of the map lane edges and at least one of the perception lane edges. The processor is arranged to operate by determining a probability score of each of the alignments that indicates whether at least one of the map lane edges of the alignment is to be the same lane line as one of the perception lane edges of the alignment, and resolving an ambiguity when no probability score of the at least one alignment satisfies at least one alignment criterion, and including determining a resolved alignment between the at least one perception lane edge and the at least one map lane edge including applying multiple ambiguity stages. Each ambiguity stage has a different ambiguity test, and at least two of the ambiguity stages are arranged to determine whether to increment a non-ambiguity count depending on the magnitude of likelihoods related to the at least one alignment. The processor is arranged to operate by determining the resolved alignment exists when the alignment between the at least one perception lane edge and the at least one map lane edge has a highest non-ambiguity count.

In another example implementation, the at least one processor is arranged to operate by: determining map and perception non-lane objects on and near the roadway segment including segments before or after or both of the roadway segment, computing a group longitudinal map bias including factoring distances between map and perception non-lane objects of multiple pairs, and applying the group longitudinal map bias to adjust map or perception lane edge positions of the map or perception data.

In another example implementation, the at least one processor is arranged to operate by: combining the group longitudinal map bias and a lateral map bias determined by using the probability score and the resolved alignment to form a map bias correction, and applying the map bias correction to generate a group association between map lane edges and perception lane edges while factoring distance as a lane feature.

In another example implementation, the at least one processor is arranged to operate by using the group association to provide a previous association to be used in a future ambiguity stage.

BRIEF DESCRIPTION OF THE DRAWINGS

The present disclosure will hereinafter be described in conjunction with the following figures. The figures are not to scale and numerals in the figures denote like elements, and where:

FIG. 2 is a schematic diagram of an example perception-map edge association system of FIG. 1 and according to at least one of the implementations herein;

FIG. 3 is a flow chart of an example method of performing perception-map edge association according to at least one of the implementations herein;

FIG. 7 is a table showing the results of the lateral correction of FIG. 6 according to at least one of the implementations herein;

FIG. 17 is a flow chart of an example third stage ambiguity resolution of the method of FIG. 12 according to at least one of the implementations herein.

DETAILED DESCRIPTION

Figure 1:
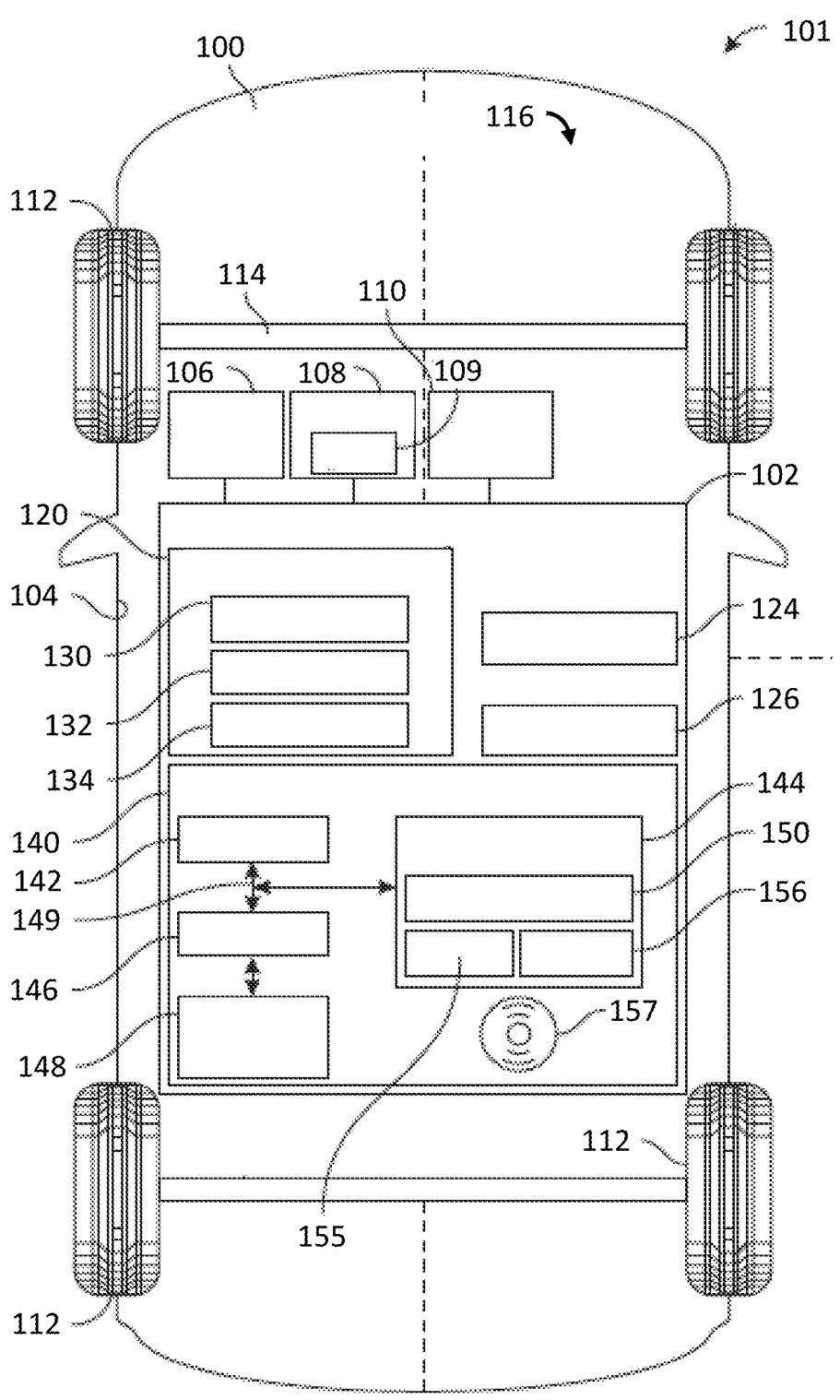
FIG. 1 is a schematic diagram of an example vehicle with an example system to perform perception-map edge association according to at least one of the implementations herein.

The following detailed description merely presents example implementations and is not intended to limit the disclosure or the application and uses thereof. Furthermore, no intention exists to be bound by any theory presented in the preceding introduction and summary, or the following detailed description.

One example of map bias occurs when map data may not include an accurate indication of the lane counts in a roadway or contains incorrect geometry. The map data may include missing or inaccurate information for a variety of reasons such as, for example, due to changes in the real road layout that has occurred since the map data was collected because of construction as one example.

An autonomous driving system associates perception lane edges and map lane edges together (or matches them) based on a one-to-one relationship for localization and scene creation purposes. However, issues may arise when the autonomous driving system attempts to associate the perception lane edges and the map lane edges with one another due to missing, inaccurate, or inconsistent map and/or perception data. Furthermore, it is to be appreciated that high-definition maps, which provide a level of detail of the vehicle's surrounding environment required for autonomous driving, may not always be available, which may also create issues when associating the perception lane edges with the map lane edges.

In addition to the above-mentioned challenges, global navigation satellite systems (GNSS) denied (weak, obstructed, or completely unavailable) environments remain a challenge for perception-map association tasks. This is because a high uncertainty of a host pose on the map may cause misalignment between perception lane edges and the corresponding map lane edge candidates when projecting map lane edge candidates in the perception frame. Thus, map lane bias results when a high-definition map data is unavailable.

To resolve these issues, the present methods and systems disclosed herein perform a lateral alignment of perception lane edges with map lane edges of a roadway segment that may be used for vehicle navigation and/or autonomous driving. The lateral alignment is accomplished by determining group alignment probability scores where each group alignment has one or more individual alignments or matches of perception and map lane edges. A likelihood of each individual alignment is factored to determine a group alignment probability score, and each individual alignment likelihood is generated by factoring a number of edge features without factoring distance between paired perception and map lane edges. It should be noted that the term 'lane edge' may be used interchangeably herein with the terms edge, lane, lane line, and line. Also, the term 'match' indicates an association or alignment with a likelihood of indicating the same lane line or object, and is meant to indicate more than being paired for comparison and analysis unless the context indicates otherwise.

By one form, lane width mismatches and errors between perception lanes and map lanes may result from low-quality maps. It has been found, however, that the lane width mismatches may be mitigated by relaxing the constraint on distance (by omitting distance) as a restricting alignment metric or feature during the lateral alignment process in conjunction with maintaining the arrangement or order of neighboring lane edges relative to each other during alignment. In other words, the perception lane lines do not change position and orientation relative to each other, and the map lane lines do not change position and orientation relative to each other, and both maintain a global orientation such as to North.

Thus, distance is not factored for lateral alignment while determining a best group alignment, and until after a group alignment with the highest probability is selected. Once a final lateral alignment is determined, then the distance is used after errors are removed and when applying a finalized or determined map bias correction to the map data. In this latter case, corrected map edges will be associated with their corresponding perception edges based on "tight thresholds", referring to the distance now being factored as described below. Thus, distance is eventually factored with the other edge features when applying a determined or final bias correction to compensate for a map bias. The result is that lateral alignment along with a longitudinal alignment that is based on matching perceived and map objects by a roadway rather than matching the edges or lanes themselves, results in the removal of a map bias.

When no group alignment is selected, an ambiguity process is performed to resolve the existing ambiguities where the system cannot detect which of a number of individual perception and map edge lane alignments are the correct matches. This may involve using a number of stages, such as three, where each stage has a different ambiguity process to determine a resolved group alignment (or resolved alignment) that should be used. One stage decouples low likelihood individual alignments to emphasize higher likelihood individual alignments, while another stage uses historical information and aligns edges of current individual alignments of a current roadway segment to edges of pervious finalized individual associations of a group association.

Another stage similarly uses historical data and corresponds lane or edge features of edges of current individual alignments to lane features of edges of the previous individual associations of the previous roadway segment to use only those individual alignments with matching features. By one example form in the historical stages, each instance of sufficiently matched individual alignments and/or sufficiently matched features, a non-ambiguity count is incremented, and the group alignment with the highest non-ambiguity count may be used as the group alignment for the bias correction. Other operations that may be performed for the lateral alignment and ambiguity resolution, as well as more details of these operations are provided below.

The present method and system described herein applies a perception-to-map association robustness for lateral bias measurement through lateral feature alignment and map bias correction. The disclosed method also resolves ambiguities in perception-map lane edge associations, and adds association robustness to lane shifts due to construction zones and lane merge scenarios, and an ability to associate in complex scenarios such as intersections due to longitudinal alignment logic and an ability to address perpendicular lane edges. The present method also provides an association robustness to lane width mismatch and lane count mismatch between perception and map lane edges, while providing a robustness to longitudinal lane edge identification switching due to noisy perceived lane edges.

Referring now to FIG. 1, an example system 101 includes one or more vehicles 100 each to perform perception-edge map association for autonomous driving or other navigation systems. In various implementations, the perception-map edge association system may be provided on the vehicle 100 and may have tasks performed in accordance with process 300 (FIG. 3) and sub-processes and implementations thereof of FIGS. 4-18, in accordance with example implementations described herein.

Specifically, as described in greater detail further below, in various implementations, the vehicle 100 has a controller 140 (or computer system) with processor circuitry that forms at least one processor 142 and a memory 144 that stores programs 150 including perception-map edge association system software and/or firmware that performs the perception-map edge association tasks as described in detail below.

By one example form, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain implementations such as trucks with more than four wheels, and so forth. In certain implementations, the vehicle 100 may also comprise any other motorized vehicle with cameras and/or sensors that may at least detect or perceive an environment near a vehicle sufficient and receive map data to generate navigation data or for autonomous driving.

In some implementations, the vehicle 100 may be operated in whole or in part by a human driver, or alternatively may comprise an autonomous or semi-autonomous vehicle, for example in which vehicle control (including acceleration, deceleration, braking, and/or steering) is automatically planned and executed by a control system 102 of the vehicle 100, in whole or in part. In addition, the vehicle 100 may be operated by a human at certain times and via automated control at other times. In some forms, the vehicle may only have manual control. Thus, the vehicle 100 may include one or more functions that may be controlled automatically via the control system 102 to provide driver assistance features for example.

Also, the example vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. A drive system 110 is mounted on the chassis 116, and drives the wheels 112, for example via axles 114. The drive system 110 preferably comprises a propulsion system such as an internal combustion engine and/or an electric motor/generator, any variation thereof or any other propulsion system, and coupled with a transmission thereof.

By some forms, the vehicle 100 also includes a braking system 106 and a steering system 108 with a steering wheel

109 in various implementations. In example implementations, the braking system 106 controls braking of the vehicle 100 using braking components that are controlled via inputs provided by a driver (e.g., via a braking pedal in certain implementations) and/or automatically via the control system 102. Also in example implementations, the steering system 108 controls steering of the vehicle 100 via steering components (e.g., the steering wheel 109) that are controlled via inputs provided by a driver (e.g., via the steering wheel 109 in certain implementations) and/or automatically via the control system 102.

By one approach, the control system 102 is coupled to the braking system 106, the steering system 108, and the drive system 110. In various implementations, the control system 102 at least facilitates the generating and processing of observational data on camera images or detected by other sensors for the vehicle 100 and/or for other vehicles. In addition, in certain implementations in which the vehicle 100 is an autonomous or semi-autonomous vehicle, the control system 102 also provides in certain circumstances control over automated features of the vehicle 100 (including automated operation of the braking system 106, the steering system 108, and/or the drive system 110), including using one or more models that are trained using the observational data.

As depicted in FIG. 1, in various implementations, the control system 102 includes a sensor array 120, a display 124, a transceiver 126, and the controller 140. By one example, the sensor array 120 obtains sensor data for generating the observational data. In various implementations, the sensor array 120 includes one or more cameras 130 (such as video cameras and/or still image cameras). Also in some examples, the sensor array 120 may also include one or more other detection sensors 132 (e.g., radar, sonar, light detection and ranging (LIDAR), infrared, or the like) and/or other sensors 134 (e.g., vehicle position sensors, speed sensors, accelerometers, gyroscopes, inertial sensors, braking sensors, steering sensors, suspension sensors, and so on).

In various implementations, the vehicle cameras 130 used to obtain images of the observational data of the road may include front, rear, side, and/or surround-view cameras including wide angle, 360 degree, and/or fish-eye lens cameras, as well as monocular, stereo, infrared, time-of-flight, thermal, LIDAR cameras, and so forth. These cameras 130 may capture images that are then processed by object detection algorithms that may be used to detect and measure a roadway (also referred to herein as a road or path) on which the vehicle 100 is operating and is able to detect shape, size (e.g., dimensions) and otherwise recognize and/or label road surfaces, lane lines, curbs, sidewalks, driveways, and other objects near the roadway including guard rails, barriers, traffic lights, signs, light poles, hydrants, and many other objects. Such imaging systems also measures distances from the vehicle 100 to road surfaces, lane lines, signs, barriers, and positions and movement of pedestrians, vehicles, drivers, and various other details of the roadway and activity pertaining thereto. In various implementations, video camera images are obtained. Additionally or alternatively, still camera images may be obtained.

In various implementations, the detection sensors 132 and/or other sensors 134 obtain additional information as to the roadway and/or the operation of the vehicle 100 itself (e.g., position, speed, deceleration and/or acceleration thereof, and so on) for use in operating the vehicle 100, for example in accordance with autonomous operation of the vehicle 100 and/or of certain components thereof. This may include radar sensors, ultrasonic, and other types of sensors as well as inertial measurement units (IMUs) that may detect the motion and orientation of a vehicle.

By one example form, and rather than using cameras 130 alone to detect objects and perceive the environment around the vehicle, the cameras 130 are used as part of an automated driving system (ADS), an advanced driver assistance system (ADAS), and/or similar system that uses both optics and the other detection sensors 132 and other sensors 134 to detect the roadway, lane lines, and objects near the roadway. Thus for example, data collected from camera images, radar, LiDAR, and ultrasonic sensors may be used together to detect these objects. This may include performing sensor fusion and machine learning or neural network models that receive input from a variety of sensors rather than image data alone, as well as other techniques.

In the present example, the vehicle 100 also includes a transceiver 126 to communicate with remote systems, servers, devices, modules, or units. Thus, one or more parts or components (or units) of the control system 102 and/or controller 140 that performs processing for any of the operations described herein related to perception-map edge association may be performed remotely when desired. Specifically, in various implementations, the controller 140 (and, in certain implementations, the control system 102 itself) is disposed within the body 104 of the vehicle 100. In one implementation, the control system 102 is mounted on the chassis 116. In certain implementations, the controller 140 and/or control system 102 and/or one or more components thereof may be disposed outside the body 104, for example on a remote server, in the cloud, or other device where image processing is performed remotely. It will be appreciated that the control system 102 and/or the controller 140 may otherwise differ from the implementation depicted in FIG. 1. For example, the controller 140 may be coupled to, or may otherwise utilize, one or more remote computer systems and/or other control systems, for example as part of one or more of the above-identified vehicle 100 devices and systems.

The transceiver 126 also may be used to receive map data that is to be compared to the perception data generated by the vehicle's onboard sensor and other systems to add external environmental data to the onboard navigation systems including the perception-map edge association system herein. Thus, the transceiver 126 may be a high-frequency transceiver to receive real-time map data. Otherwise, the transceiver 126 may be part of a satellite communication systems (SCS) such as a global positioning system (GPS) or satellite-based augmentation systems (SBAS). Wi-Fi modules may be used to connect to local networks or hotspots on cellular or satellite networks. Bluetooth technology may be used to facilitate short-range data exchanges with nearby vehicles or infrastructure for localized map data sharing. Mesh networks may be used to form ad-hoc mesh networks with other nearby vehicles to exchange map data, utilizing protocols designed for vehicle-to-vehicle (V2V) communication for example. Such data communication networks may include 4G/5G cellular networks, dedicated short-range communications (DSRC), and emerging vehicular communication protocols such as cellular vehicle-to-everything (C-V2X). The sources of the map data may range from government agencies that provide infrastructure information, private mapping companies that offer dynamic road condition updates, the vehicle manufacturer, the navigation system developer, and/or crowdsourced data from other vehicles on the road, to name a few examples.

Also, the control system 102 may have a display on the vehicle 100 that may provide messages or show maps to occupants of the vehicle 100, such as to show the vehicle position and orientation on a roadway. The display 124 may be any that may provide a screen for an occupant or user in the vehicle to see the images on the display 124. Such a display may be a digital display, a graphical user interface (GUI), an LED display, a plasma display, an LCD display, an organic light emitting diode (OLED) display, a thin-film transistor (TFT) display, heads up display (HUD), 3D displays, holographic displays, virtual or augmented displays, and so forth.

In various implementations, the controller 140 is coupled to the sensor array 120, as well as to the braking system 106, the steering system 108, and the drive system 110. In various implementations, the controller 140 is also coupled to the display 124 and the transceiver 126.

In various implementations, the controller 140 comprises, or is, a computer system, and includes the processor 142, the memory 144, an interface 146, a storage device 148, and a computer bus 149. In various implementations, the controller (or computer system) 140 obtains sensor data from the sensor array 120, and in certain implementations additional data via the transceiver 126. In various implementations, the controller 140 processes the observational data, including images of a roadway up ahead on an expected path of the vehicle 100. In certain implementations, the controller 140 also uses the observational data for developing, training, and/or implementing one or more autonomous driving models for the vehicle 100 (e.g., for automated control of the braking system 106, steering system 108, and/or drive system 110). In various implementations, the controller 140 provides these and other functions in accordance with the steps of the processes and implementations depicted in FIGS. 2-18 and as described further below in connection therewith.

In the depicted implementation, the controller 140 (or computer system) includes the processor 142 to perform the computation and control functions of the controller 140, and may comprise circuitry or circuits that form any type of processor or multiple processors, single integrated circuits such as a microprocessor, or any suitable number of integrated circuit devices and/or circuit boards working in cooperation to accomplish the functions of a processing unit. This may include a System on a Chip (SOC) and/or one or more processor cores. During operation, the processor 142 executes one or more programs 150 including the perception-map edge association system described herein, and contained within the memory 144 and, as such, controls the general operation of the controller 140 and the computer system of the controller 140, generally in executing the processes described herein, such as the processes and implementations depicted in FIGS. 2-15 and as described further below in connection therewith.

The memory 144 may be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted implementation, the memory 144 stores the above-referenced program 150 along with one or more databases 155 (e.g., pertaining to perception and/or map data and/or perception/map association computations described herein) and other stored values 156.

The bus 149 serves to transmit programs, data, status and other information or signals between the various components of the computer system of the controller 140. The interface 146 allows communication to the computer system of the controller 140, for example from a system driver and/or another computer system, and may be implemented using any suitable method and apparatus. In one implementation, the interface 146 obtains the various data from the sensor array 120 and/or a navigation system with map data. Such a navigation system may be one of the programs 150 mentioned above. The interface 146 may include one or more network interfaces to communicate with other systems or components.

The storage device 148 may be any suitable type of storage apparatus, including various different types of direct access storage and/or other memory devices. In one example implementation, the storage device 148 comprises a program product from which memory 144 may receive the program 150 that executes one or more implementations of the processes and implementations of FIGS. 3, 4, 9, 12, 13, 15, and 17 and as described further below in connection therewith. In another example implementation, the program product may be directly stored in and/or otherwise accessed by the memory 144 and/or a secondary storage device (e.g., disk 157), such as that referenced below.

The bus 149 may be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this example implementation is described in the context of a fully functioning computer system, it will be appreciated that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computing device such as a computer processor (such as the processor 142) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain implementations. It will similarly be appreciated that the computer system of the controller 140 may also otherwise differ from the implementation depicted in FIG. 1. For example, the computer system of the controller 140 may be coupled to or may otherwise utilize one or more remote computer systems and/or other control systems.

Figure 2:
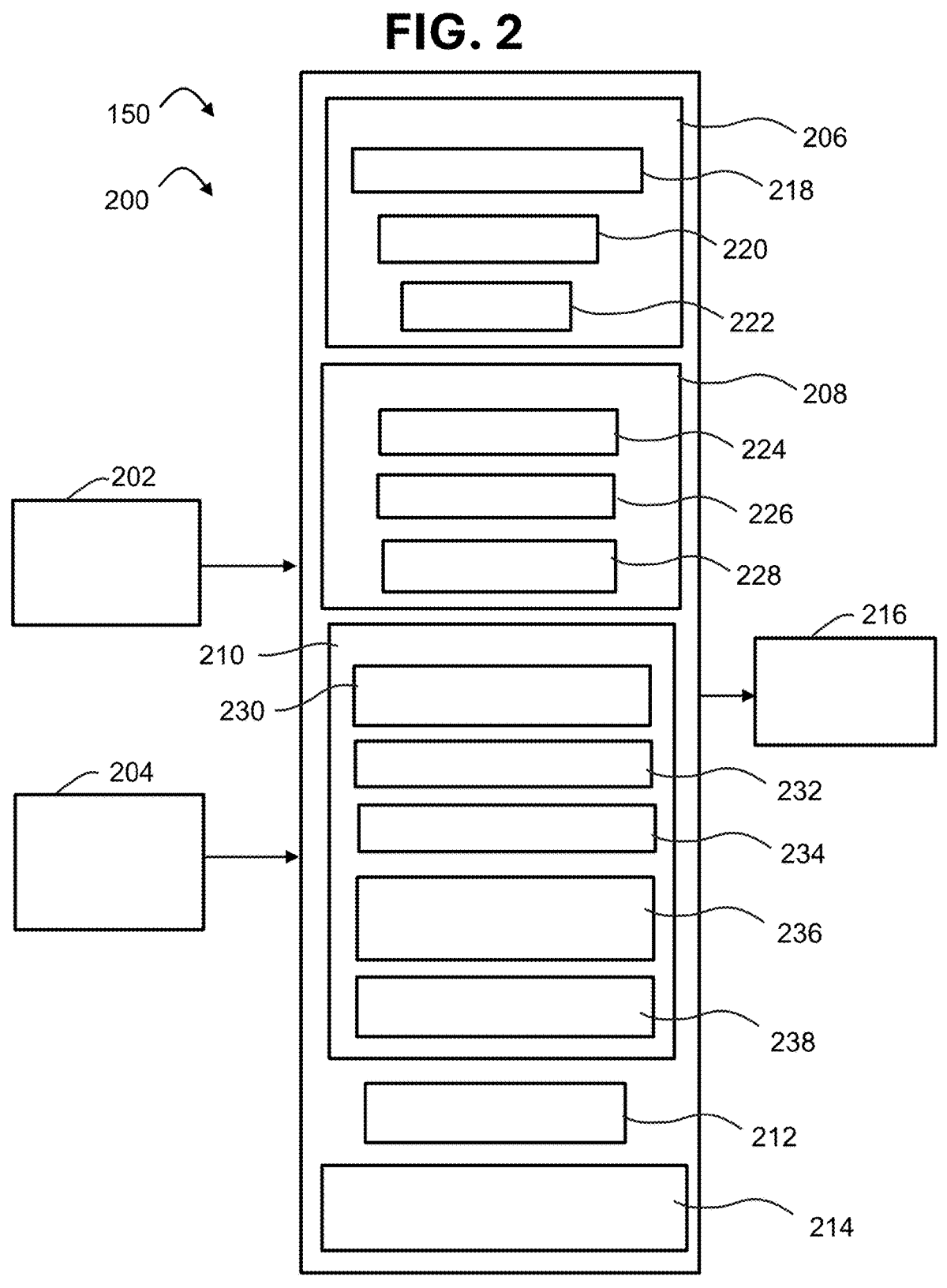

Referring to FIG. 2, a program 150 is shown that is a perception-map edge association (PMEA) system 200 and that is operated by at least one processor 142 of controller 140 of FIG. 1. The PMEA system 200 receives data of perception lane edges and objects (P) 202 to compare to map lane edges and objects (M) 204 to determine where matches exists to remove map biases and resolve ambiguities as mentioned. The PMEA 200 has a lateral alignment unit 206, a longitudinal alignment unit 208, an ambiguity resolution unit 210, a map bias correction unit 212, and a PMEA tight threshold units. The output is associated P-M lane edges 216.

The lateral alignment unit 206 has an alternatives generation unit 218, a probability score unit 220, and a ratio unit 222. The longitudinal alignment unit 208 has an object detection unit 224, a distance unit 226, and a group correction unit 228, while the ambiguity resolution unit 210 has an ambiguity test unit 230 that may be considered part of the lateral alignment unit 206 or separate from both, a decoupling unit 232, an ego lane tracking unit 234, an ego lane feature consistency unit 236, and a candidate selection unit 238. The operation of these units and sub-units of the PMEA system 200 are described in detail below with processes 300, 400, 900, 1200, 1300, 1500, and 1700.

Referring to FIG. 3, a process 300 of performing perception-map edge association is provided according to at least one of the implementations described herein. The process 300 is described with operations 302-320 generally numbered evenly. The systems, roadways setups, processes, devices, and vehicles of any of FIGS. 1-2 and 4-18 may be referred to where relevant.

Process 300 generally includes five phases to associate perception and map lane edges that may handle roadway areas with large map biases, and including lateral alignment, longitudinal alignment, ambiguity resolution, map bias correction determination, and lane edge association. The disclosed method and system also operates well even when high definition (HD) maps may not be available.

Process 300 may include "input map (M)" 302, where map data 204 of a roadway map (FIG. 2) may be obtained and provided for the association operations. The map data 204 may be obtained via various sources and communication equipment already described above with FIG. 1. The map data 204 may include one or more roadway segments to be analyzed, and may include any roadway configurations includes straight or curved segments, intersections, single lane or multi-lane, and so forth without limitation as long as the configurations are mapped. The map data 204 includes at least map lane edges. The map data 204 also may include object data of any non-lane objects near the roadway, including roadway and other signs, traffic signals, guard rails, construction barriers, plant life, buildings, fences, and other structures, bridge structures, fire hydrants and other fluid system equipment, lighting equipment such as light poles, electrical boxes, and so forth, In any of these cases, the lane and object data may be provided as image data alone including location and orientation data. Data of such object locations may be used to determine the object locations relative to lane locations on the map data 204. Also, sematic data may be provided as well including labels for the lanes, objects, or both, such as a code for a stop sign, and so forth.

Process 300 may include "input perception (P)" 304, and this refers to the perception data (P) 202 (FIG. 2). This may include data of the same lane and objects as in the map data and for the same roadway segment. The perception data 202 is obtained by using vehicle sensors and other components, systems, or services providing localization and other navigation data to the vehicle control system 102 and controller 140.

Process 300 may include "perform lateral edge alignment" 306, and performed by the lateral alignment unit 206. This involves generating multiple alternative group alignments where each group alignment has one or more individual alignments each with a different pair of a perception lane edge paired to a map lane edge. Features of the lines are used to generate an individual alignment likelihood, and in turn, a group alignment probability score. The system then compares a ratio of the probability scores to determine a best or high probability score group alignment that should be confirmed and used as a final group association to set a final map bias correction and apply the correction for navigation and autonomous driving, for example. It will be understood that the terms lateral and longitudinal herein are relative to a forward heading of the host vehicle with the controller 140 performing the perception-map association. More details are provided in a lateral alignment process 400 (FIG. 4) and examples are explained with FIGS. 5-8.

Process 300 may include the inquiry "ambiguous alignment?" 310 that determines whether the probability score ratios indicate at least one of the group alignments, or best or highest probability group alignment, has a sufficiently high probability. This may be performed by the ambiguity test unit 230.

If so, process 300 may include "determine map bias correction" 312. This operation involves combining a determined longitudinal map bias, if present, and the determined lateral bias of the group alignment with the highest probability score (or highest ratio) to form a single map bias correction. This is performed by the map bias correction unit 212.

Otherwise, the perception-map lane edge alignments are too ambiguous. In other words, for example, the system cannot sufficiently determine whether at least one of the perception lane edges matches a specific one of the map lane edges in a group alignment, such that all of the resulting group alignment probability scores are too low. In this case, a three stage ambiguity resolution process is performed to resolve the ambiguities.

Figure 12:
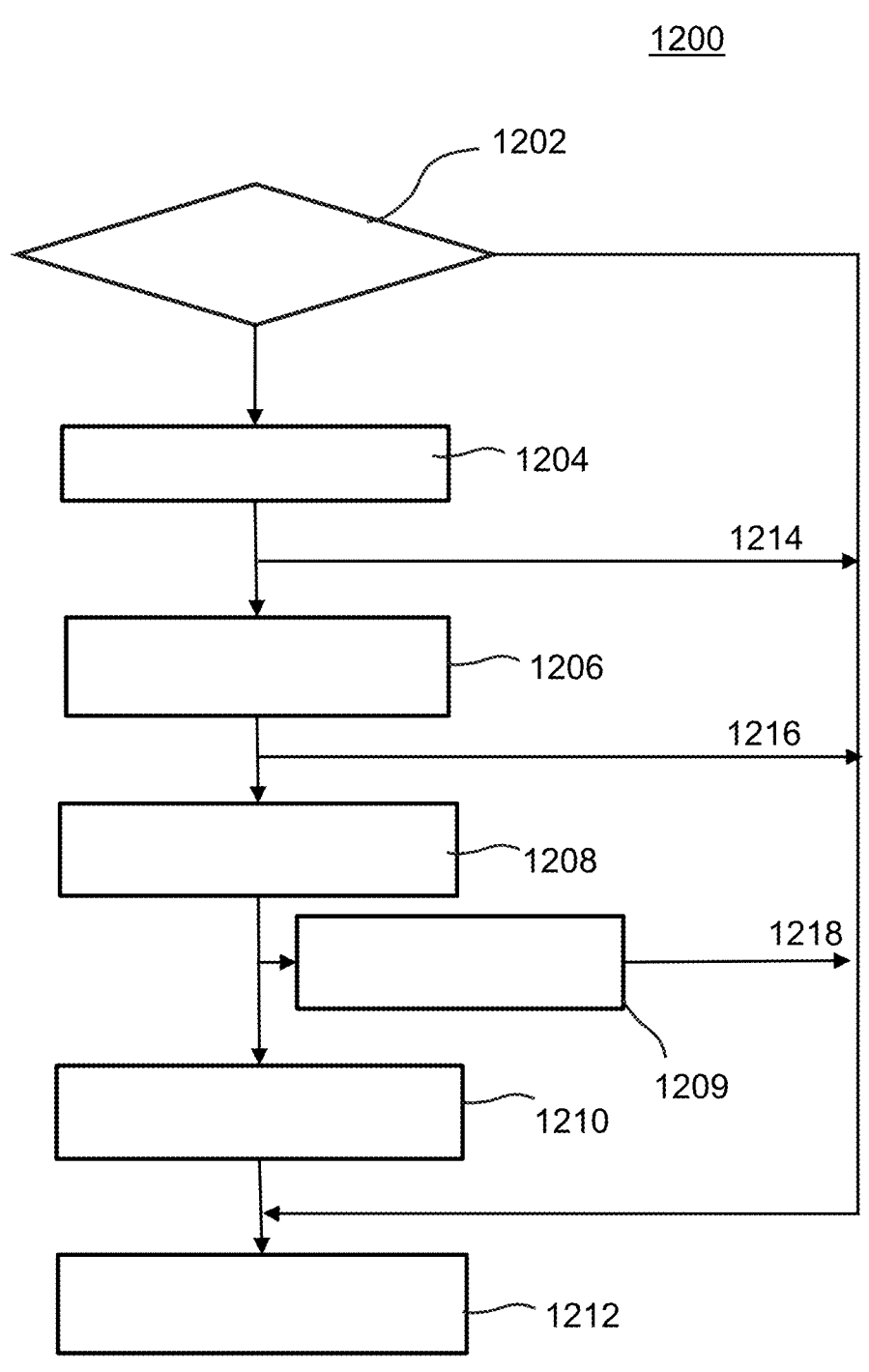
FIG. 12 is a flow chart of an example method of resolving ambiguities for perception-map edge association according to at least one of the implementations herein.
Figure 17:
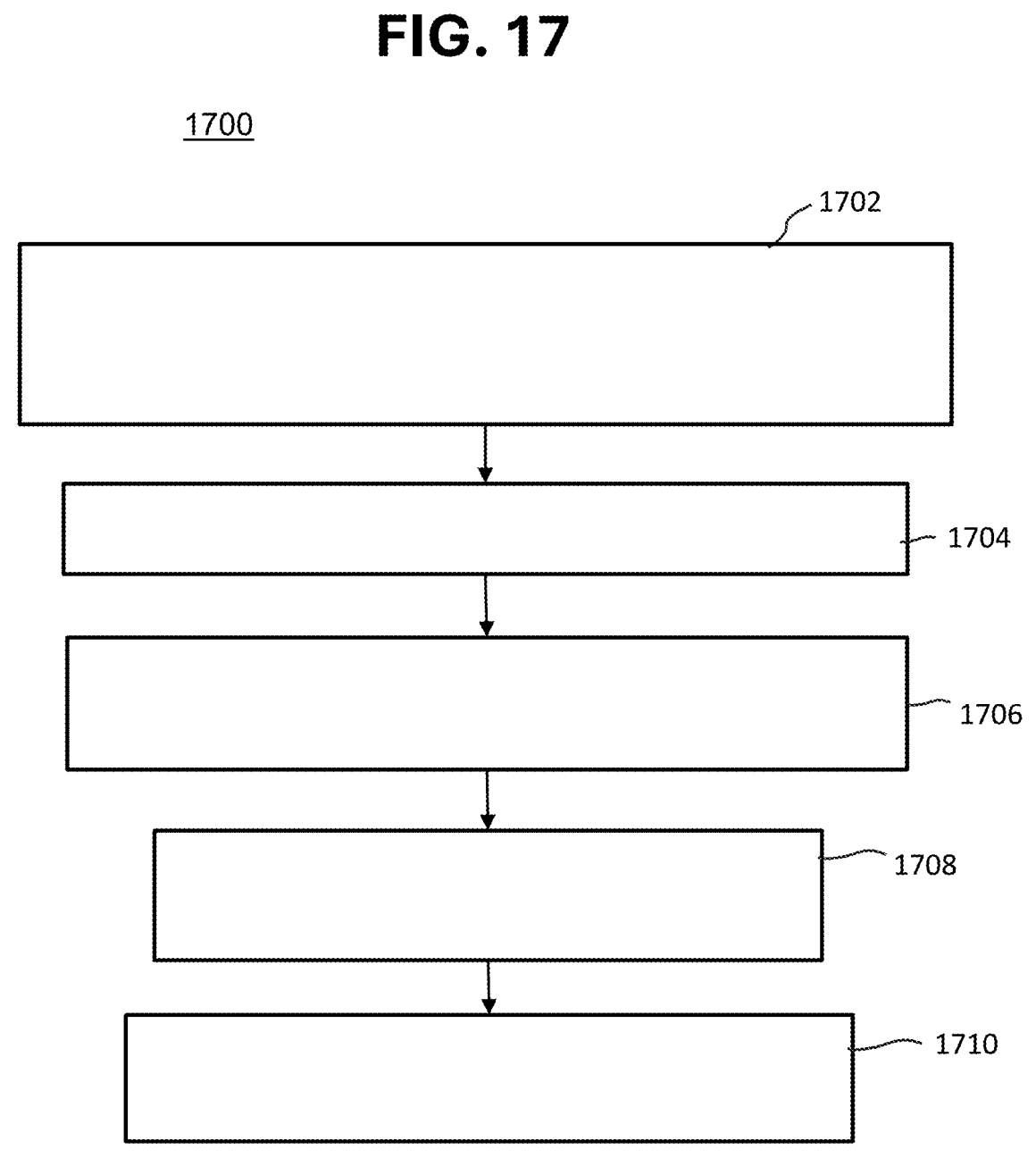

Thus, process 300 may include "resolve ambiguity" 314, and this is performed by the ambiguity resolution unit 210. The overview of this process is provided at process 1200 (FIG. 12). Three stages are performed with one stage that involves decoupling or removing (or ignoring) low likelihoods of individual alignments. In another ambiguity stage, historical data is used and determines ambiguity individual alignments that and whether a previous perception or map lane edge of a previous roadway segment aligns to a current perception or map lane edge of a current roadway segment. In yet another historically-based ambiguity stage, the system compares features of the lanes of the current individual alignments to the features of the previous individual associations. This may use a non-ambiguity counter to count the matches of the ambiguity individual alignments with matching lane configurations, and/or count the ambiguity individual alignments with matching features. The details of the three stages are provided below in processes 1300 (FIG. 13), 1500 (FIG. 15), and 1700 (FIG. 17). The result is resolution of the ambiguities and a resulting highest probability (or selected) group alignment that is a resolved alignment to be used to set and apply the lateral map bias and final map bias correction.

Separately, process 300 may include "perform longitudinal object alignment" 308 and includes a longitudinal alignment unit 208 that determines a longitudinal map bias by using the perception and map objects rather than the lane edges. The details of the longitudinal alignment are provided at process 900 (FIG. 9) below.

Figure 5:
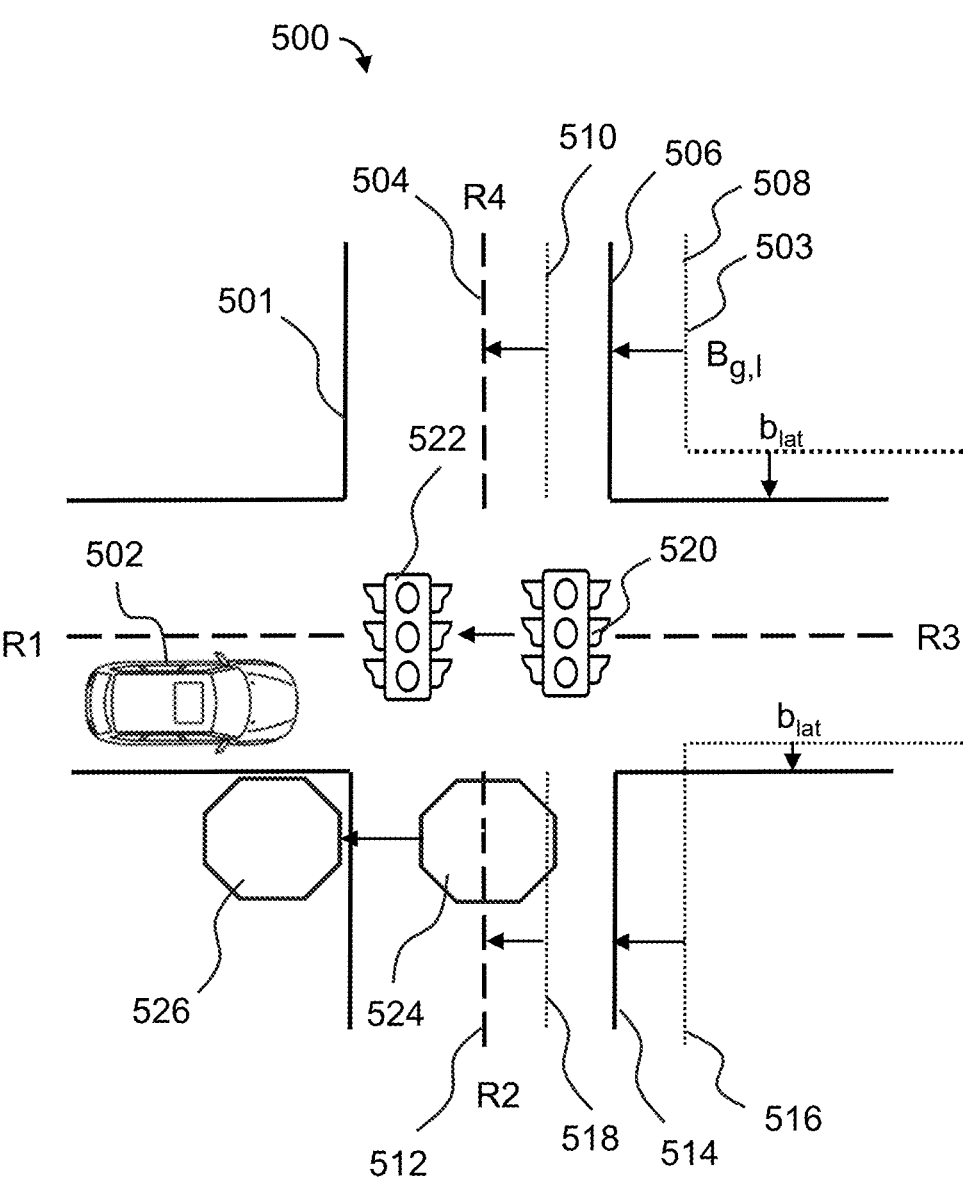
FIG. 5 is a schematic diagram of an example intersection used to explain perception-map edge association according to at least one of the implementations herein.

Referring to FIG. 5 as one example implementation showing the lateral and longitudinal bias corrections, an intersection or roadway segment 500 has a host vehicle 502 (or more precisely, vehicle location) performing the analysis herein and intersecting roads or streets R1, R2, R3, and R4. Perception data 501 has edges with thicker, continuous lines, while the map data 503 has thinner dashed lines, and this is maintained throughout all roadway figures herein unless mentioned otherwise. The perception data includes side or curb lines 506 and 514, centerlines 504 and 512, stop sign 526, and traffic signal 522. The map data 503 includes side or curb lines 508 and 516, centerlines 510 and 518, stop sign 524, and traffic signal 520. As shown, a longitudinal bias correction $b_{group,long}$ (shown as $b_{g,l}$) is determined and that should shift the map data along the horizontal arrows extending from the map centerlines 510 and 518 and respectively to the perception centerlines 504 and 512. Likewise, horizontal arrows of the longitudinal map bias extend from the map curb lines 508 and 516, and respectively to the perception curb lines 506 and 514. The same longitudinal bias correction is shown for the stop signs 524 and 526, and the traffic signals 520 and 522. A lateral bias correction blat is determined as shown by the vertical arrows extending from the map curb lines 508 and 516 and respectively to the perception curb lines 506 and 514.

Returning to operation 312, the longitudinal map bias is combined with the lateral map bias to form a single final map bias correction with lateral and longitudinal components. The final alignments are then referred to as associations for clarity herein.

Thereafter, process 300 may include "determine P-M edge association" 316 performed by a PMEA tight thresholds unit 214 and by applying the final map bias correction. This operation recomputes the lateral alignment component that minimizes the lateral distance between all edges and is calculated as in equations (1) and (2) above. While this operation recomputes the lateral alignment, however, now the features include distance between perception and map lane edges as well as the other lane features mentioned above to compute the individual likelihoods, and to then set a final lateral map bias value or correction. The use of the distances is referred to herein as using "tight thresholds" as mentioned above, and now the distance is included as a feature metric along with lane heading, curvature, type, and/or color.

To perform this alignment and map bias correction, a small radius search may be performed around each of the perception lane edges to capture nearby map edges. A final check of the features matching for the features mentioned above including distance is then performed, and a probability score is computed as described for the lateral alignment. The distance feature is expected to be minimal at this point because large errors already should have been removed as mentioned above.

Process 300 may include "output P-M lane edge association" 318, where the associated lane edge data may now be used for other applications such as navigation and/or autonomous driving.

Process 300 may include "provide Z−1 edge association" 320, where the previous determinations are stored in memory, including any desired data identifying final associated lanes, features, likelihood values, probability scores, group alternative alignments or associations, individual alignments or associations, and so forth, and then provided to the ambiguity resolution unit 210 as the data of the previous roadway segment to make the historical comparisons for the ambiguity stages if needed.

Figure 4:
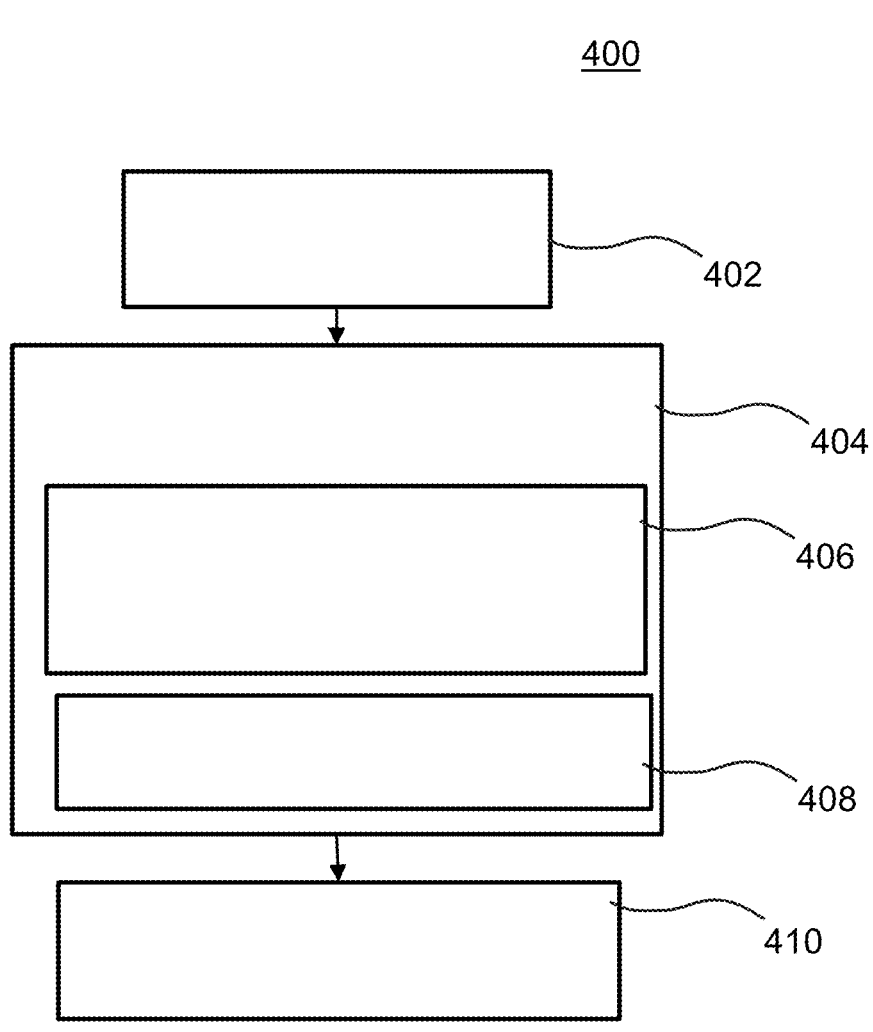
FIG. 4 is a flow chart of an example method of performing lateral perception-map edge association according to at least one of the implementations herein.

Referring now to FIG. 4, a process 400 of performing lateral perception-map association is provided according to at least one of the implementations described herein. The process 400 is described with operations 402-410 generally numbered evenly. The systems, roadways setups, processes, devices, and vehicles of any of FIGS. 1-3 and 5-18 may be referred to where relevant.

Process 400 may include "determine alternative lateral edge group alignments" 402 and formed by alternatives generation unit 218. This establishes each available group perception-map alignment alternative. In this case, and by one form, each possible group alignment will be analyzed. A group alignment is determined by maintaining or fixing the arrangement (including the orientation and position) of perception lane edges relative to each other (as in a perception image) and a global direction such as north, and maintaining the position and arrangement of map lane edges in the map or map data being used as with the perception lane edges. The perception image is then moved relative to the map to place at least one perception lane edge near a different map lane edge for each group alignment.

Figure 6:
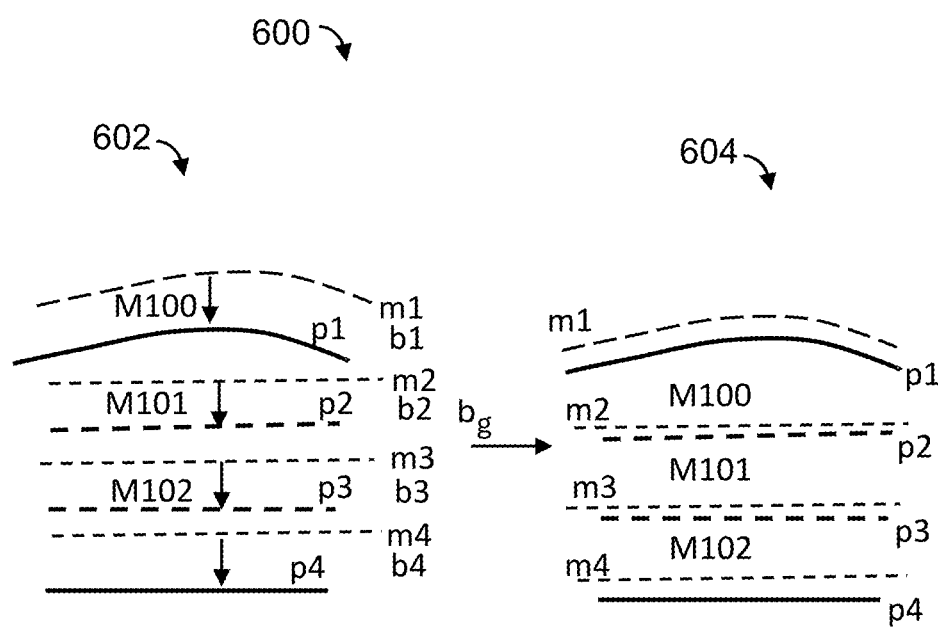
FIG. 6 is a schematic diagram of an example roadway segment showing lateral perception-map edge association according to at least one of the implementations herein.

Referring to FIGS. 6-7 for example, a roadway segment 600 has a before map bias conversion setup 602 including perception lane edges or lines p1, p2, p3, and p4, and map lane edges or lines m1, m2, m3, and m4 where edge m1 may be a side lane line, curb line, shoulder line, and so forth. The map lanes m1, m2, m3, and m4 form lanes M100, M101, and M102 as shown. One alternative group alignment may have the following preliminary pairs (p1, m1), (p2, m2), (p3, m3), and (p4, m4). Another alternative group alignment may have the following pairs (p1, m2), (p2, m3), (p3, m4), and (p4, None (or unassociated). The latter alternative appears to be the closest alignment between perception and map edges as shown but is clearly incorrect. This is shown on table 700 of FIG. 7 where the first column A is perception edges, second column B is before map bias correction-associated map edges, third column C is after bias map correction-associated map edges, and fourth column D is ground truth associated map edges, and U stands for unassociated in column B The formation of the alternative group alignments may continue until all possible different group alignments are established, while still maintaining the arrangement (or order or configuration) of the perception lanes. Thus, the system cannot pair p4 to m1 and p1 to m4 in a single group alignment since that would not make sense while maintaining the orientation of the perception image and map.

Figure 8:
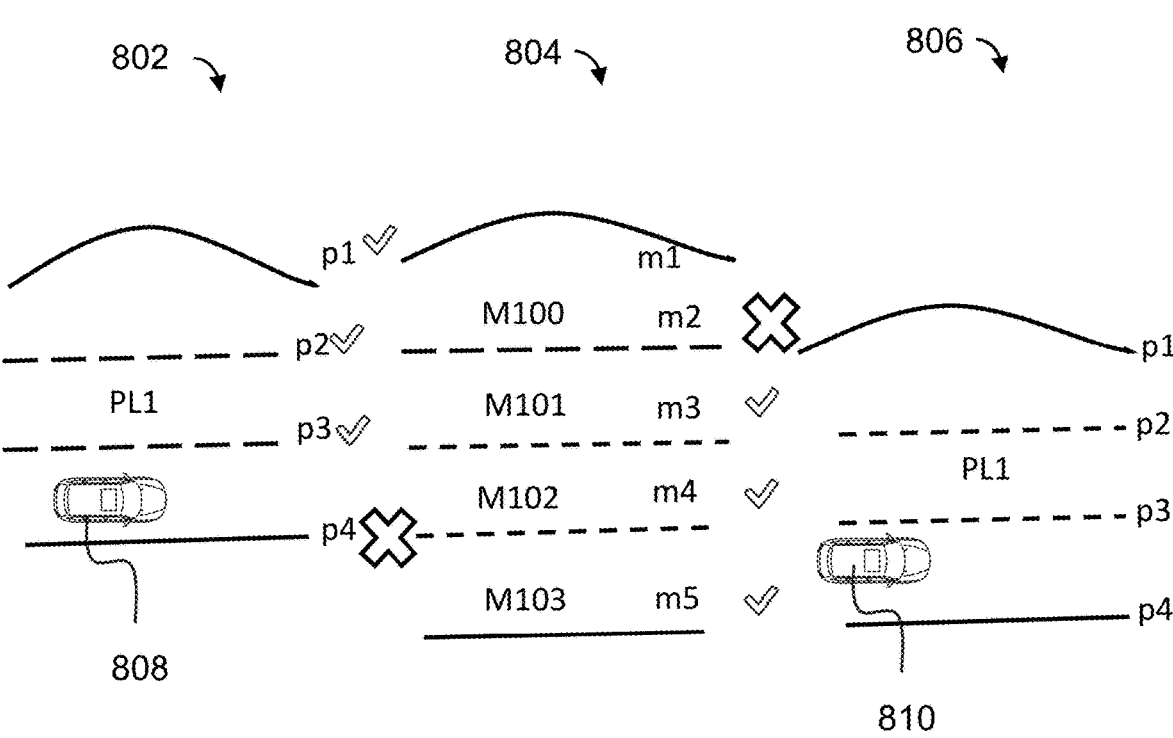
FIG. 8 is another schematic diagram of example roadways showing lateral perception-map edge association according to at least one of the implementations herein.

Referring to FIG. 8 for yet another lateral alignment example, two different alternative perception group alignments (or setups) 802 and 806 are shown relative to a single map 804. The perception group alignments 802 and 806 both show three lanes with PL1 as the center lane, and where the lanes are defined by lanes or edges p1 to p4. The same perception image is maintained from alignment 802 to 806. A vehicle 808 is in the right lane on the group alignment 802 and a vehicle 810 is in the right lane in the group alignment 806. The map 804 shows four lanes M100 to M103 defined by lane lines or edges m1 to m5.

The group alignment 802 has perception edges p1 to p4 aligned with map edges m1 to m4, and line m5 is unassociated. Instead, the group alignment 806 has perception edges p1 to p4 aligned with map edges m2 to m5, and line m1 is unassociated. Both of these alternatives are analyzed as explained as follows.

By one optional form, preliminary alternatives may be dropped when obvious such as a for a five lane highway and both the perception image and map have edges for five lanes. The alternatives where only a single perception or map lane edge are aligned as a potential match may be dropped in this case, for example.

Otherwise, process 400 may include "for each alternative group alignment, determine a probability score without factoring distance" 404 and by probability score unit 220. Specifically, this operation 404 may include "use individual lane to lane confidences of each potential lane to lane match in a single alternative group alignment" 406, where a likelihood or probability score of a group alignment is as follows.

$$L(i, j) = \frac{\begin{array}{l} p_{1conf} * l(p1, m1) + p_{2conf} * l(p2, m2) + \\ p_{3conf} * l(p3, m3) + p_{4conf} * l(p4, m4) \end{array}}{p_{1conf} + p_{1conf} + p_{3conf} + p_{4conf}} \quad (1)$$

where (i, j) are the two perception and map edge numbers being compared, where L( ) is a group (or global) likelihood or probability score (or just group probability score) of a global alignment, where each global alignment has one or more individual alignments each with an individual alignment likelihood l(pi, mj) of an alignment between a single perception lane edge pi and a single map lane edge mj, where $p_{iconf}$ is a confidence or weight applied to the individual alignment likelihoods l(pi, ji). The individual confidences $p_{iconf}$ is the probability of confidence that perception lane edge pi exists. This may be provided upstream as part of perception data and from a neural network-based lane edge detector. In order to compute the individual alignment likelihoods l(pi, mj), operation 404 may include "use multiple lane features at each individual alignment" 408. Thus, lane width match robustness may be obtained to compensate for lane width mismatches by relaxing the feature constraints by omitting distance as a feature and as mentioned above.

In the present example, and for each alignment hypothesis, each individual alignment likelihood l(pi, mj) may be computed by factoring the features of a lane (or lane line) that are considered here include heading, curvature, lane type, and color. The heading feature may refer to a global heading such as north-south, or may be a local heading consistent for both perception and map data. The curvature feature is the linearity or radius of the lane line whether constant or varying through a roadway segment. Lane type may include single line dashed or continuous, double line and both continuous, double line with single dash left line, double line with single dash right line, double line both dashed, and so forth. The color feature may include white, yellow, and any other desired color. An individual alignment likelihood l(pi, mj) is calculated by factoring the likelihoods of all of the features, in one example, but may be at least one of the features in other examples. Otherwise, different lane features than those listed here may be used as well or instead. This computation is repeated for each individual alignment likelihood l(pi, mj) in a single group alignment, and repeated for each group alignment. By the present example, the individual alignment likelihood may be computed as:

$$l(pi,mj)=\log(l\_type(pi,mj)*l\_color(pi,mj)*l\_heading (pi,mj)*l\_curvature(pi,mj)) \quad (2)$$

where l_[feature] is the individual feature match probability or likelihood. The feature match likelihood may be computed by several different probability algorithms. By one example, the likelihood is a version of a weighted cost function that sum the average Mahalanobis distance, which considers the correlations between different attributes (e.g. heading and curvature) and captures the similarity in terms of these specific characteristics, of each feature and that is between all perception points in pi and corresponding nearest neighbor map points in mj. This is disclosed by U.S. Patent Publication No. 2024/0263965, published Aug. 8, 2024, which is incorporated herein in its entirety for all purposes.

By other alternatives, the feature match likelihoods between the features of the perception and map lane edges may be performed by using localization algorithms such as simultaneous localization and mapping (SLAM) and Monte Carlo localization. Otherwise, geospatial data association algorithms such as nearest neighbor search and data association filters (such as with joint probabilistic data association filters) may be used. Another option is the use of map matching techniques or algorithms that use Hidden Markov Models (HMMs) or neural networks. Also, semantic segmentation may be used including deep learning models for semantic segmentation that may classify the environment into various categories (road, lane lines, signs, etc.).

Process 400 may include "compare a ratio of two probability scores to an ambiguity threshold" 410, and by ratio unit 222. Thus, once a probability score L(i, j) is computed for each group alignment, a ratio is determined for the two highest probability scores in order to better ensure strong relative performance among multiple group alignments in addition to the isolated likelihoods of each group alignment.

In this example, the ratio is then compared to an ambiguity threshold, although other criteria could be used instead. If the ratio is not above the ambiguity threshold, then the alignments are considered ambiguous and an ambiguous resolution process, here being process 1200 (FIG. 12), is applied as in operation 314 (FIG. 3).

If the best alignment is determined, the process continues with operation 312 (FIG. 3) to determine the final map bias correction.

Returning to the example for FIGS. 6-7, an after map bias correction setup 604 shows the perception and map lane edges moved by individual bias corrections blat (here numbered $b_1$ to $b_4$) that are combined into a single group, lateral, map bias correction $b_{group}$ (shown as $b_g$), The correct association (the first alternative from above with alignments p1-m1 to p4-m4) is shown where the distances between associated perception and map lane edges are now much smaller than before the bias correction was applied. The 'X' show where the lane edges were found not to match, such as p4 to m4 due to lane type for example, and p1 to m2 due to lane curvature for example.

Figure 9:
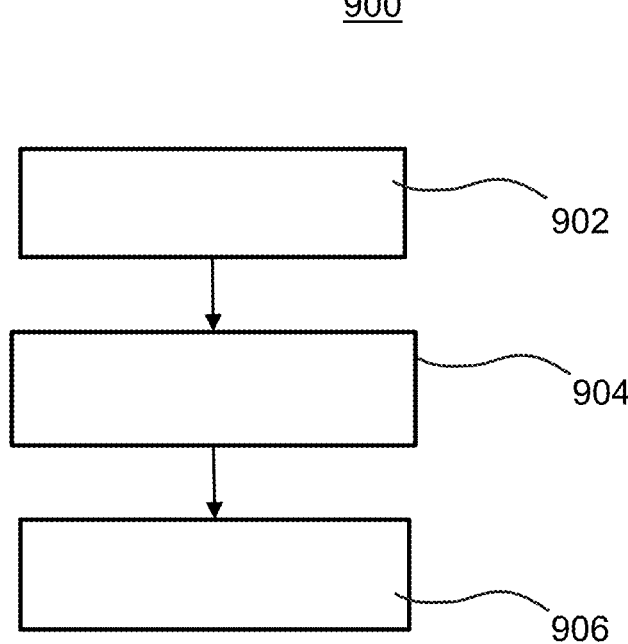
FIG. 9 is a flow chart of an example method of performing longitudinal perception-map edge association according to at least one of the implementations herein.

Referring now to FIG. 9, a process 900 of performing longitudinal perception-map association is provided according to at least one of the implementations described herein. The process 900 is described with operations 902-910 generally numbered evenly. The systems, roadways setups, processes, devices, and vehicles of any of FIGS. 1-8 and 10-18 may be referred to where relevant.

Non-lane objects are used for longitudinal alignment of the lane edges because it is particularly difficult to align lane edges longitudinally (parallel to the host vehicle). The error estimated from aligning perception with corresponding map road objects may be used to correct the longitudinal bias of longitudinal map lane edges as well as to align perpendicular lane edges to successfully associate lane edges in complex intersection scenarios.

Process 900 may include "determine amount of longitudinal objects" 902 and by object detection unit 224. This operation involves collecting the data of identified non-lane line objects for longitudinal alignment. This determines the position and identification of roadway objects such as signs, light poles, fire hydrants, traffic lights, guard rails, and so forth as mentioned above. A sufficient amount of the objects within a certain distance from the roadway segment being analyzed is used to provide a statistically significant dataset to perform the longitudinal alignment. A minimum amount of objects is determined by experimentation. If there are not enough objects, then the longitudinal alignment process is omitted.

Referring to the example of FIG. 5 again, the longitudinal objects are the traffic signals 522 and 520, and the stop sign 524 and 526.

Figure 10:
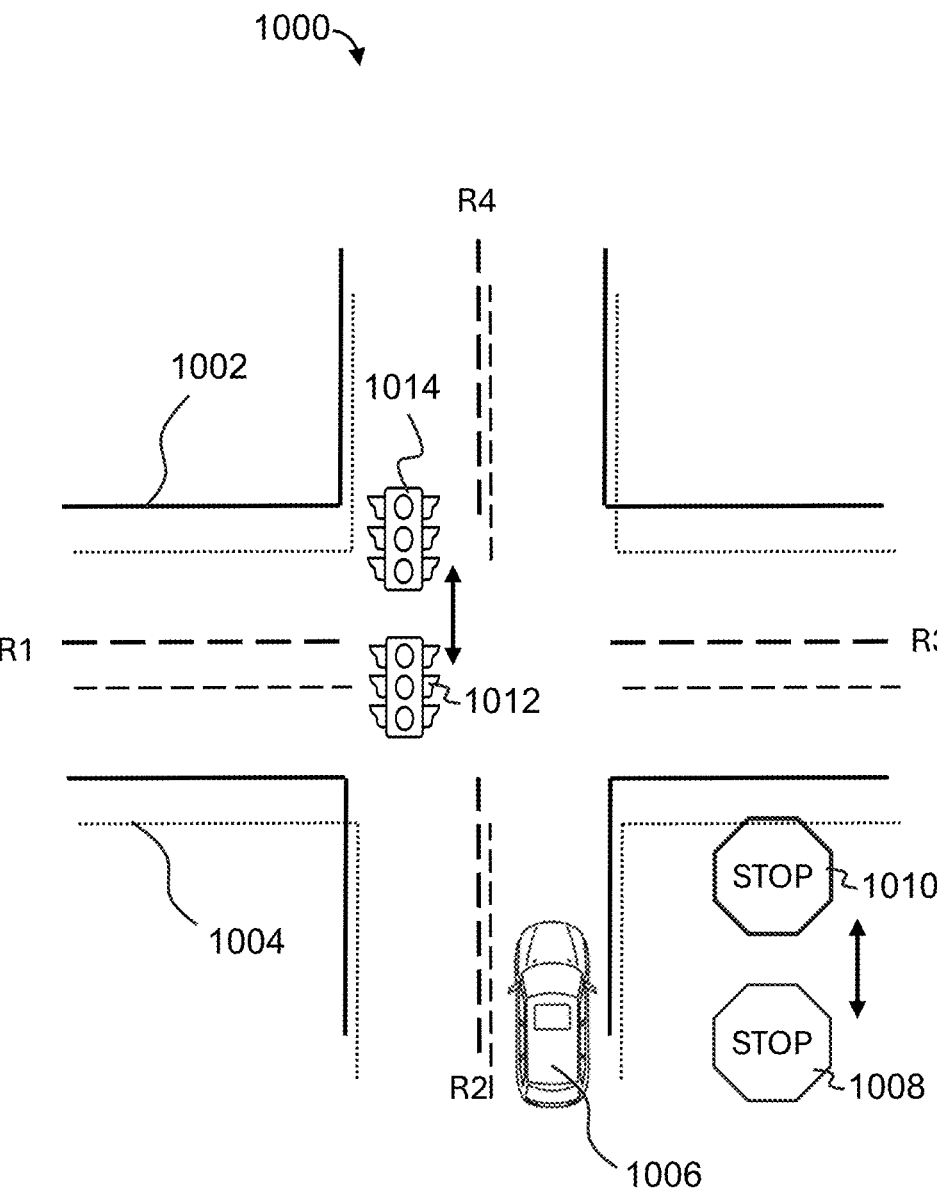
FIG. 10 is a schematic diagram of an example intersection used to explain longitudinal perception-map edge association according to at least one of the implementations herein.

Referring to FIG. 10 as another longitudinal alignment example, an intersection or roadway segment 1000 has streets R1, R2, R3, and R4, perception lane edges or image 1002, and map lane line edges or map 1004. A vehicle 1006 is on street R2 heading upward so that longitudinal is now up and down on intersection 1000, and lateral is right and left on intersection 1000. One object for longitudinal alignment here is a perception traffic light 1014 to be matched vertically with a map traffic light 1012. Another object for longitudinal alignment here is a perception stop sign 1010 to be matched vertically with a map stop sign 1008. By maintaining the arrangement of the objects relative to the lane edges, longitudinally aligning the objects will in turn result in the longitudinal alignment of the perception and map lane edges 1002 and 1004.

Process 900 may include "determine distances between P and M objects" 904, and by distance unit 226, and where the perception and map roadway objects (e.g., stop signs, traffic signs, bus stop benches, curbs, etc.) may be associated based on object type, orientation, and loose positional features. These associations are utilized to calculate the longitudinal alignment component that minimizes the longitudinal distance between all road objects, and the result is passed downstream. Thus, to determine distances between the perception and map objects, a longitudinal group correction $b_{group,long}$ is based on the longitudinal bias of all or multiple roadway objects, where bx is estimated and where:

$$b_{group,long} \mathrel{*}= \mathrm{argmin}_{b_{group,long}} \left( \sum_{i=1}^{N_{object}} \| (p_i - (\hat{m}_i + b_{groug,long})) \|_2^2 \right) \quad (3)$$

where $\hat{m}$ is the nearest neighbor associated map road object to perception object $p_i$, and where eq. (2) is the square of the L2 norm. Thus, process 900 may include "compute longitudinal group correction" 906 performed by the group correction unit 228, where the result is a longitudinal group correction $b_{group,long}$. The longitudinal group correction $b_{group,long}$ is represented by the arrows on intersection 1000 (FIG. 10).

Figure 11:
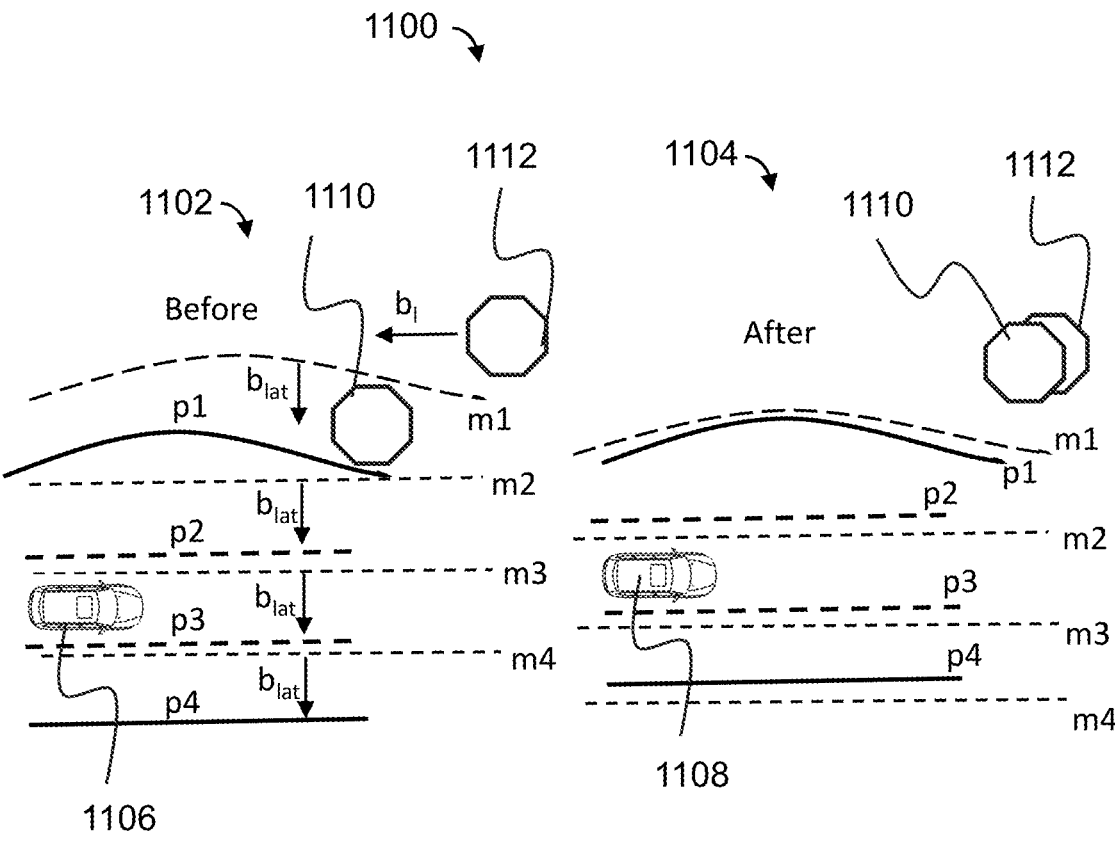
FIG. 11 is a schematic diagram of an example roadway segment showing longitudinal perception-map edge association correction according to at least one of the implementations herein.

Referring to FIG. 11 for yet another example, a roadway segment 1100 is similar to roadway segment 600 (FIG. 6) and similar items are designated similarly. Here, however, the vehicles 1106 and 1108 are in the center lane rather than the right lane, and the longitudinal bias applied to change from the 'before' setup 1102 to the after setup 1104 shows a much closer alignment between perception and map stop signs 1110 and 1112 than before a longitudinal bias $b_{long}$ (or just $b_1$ as shown) is applied at the before arrangement 1102. This results in a much better longitudinal alignment (from right to left) of the perception lane edges p1 to p4 to the map lane edges m1 to m4 in addition to the lateral alignment that is shown. This is clearest with the matching of perception lane edge p1 and map lane edge m1.

Referring to FIG. 12, a process 1200 of performing ambiguity resolution for lateral perception-map association is provided according to at least one of the implementations described herein. The process 1200 is described with operations 1202-1212, generally numbered evenly. The systems, roadways setups, processes, devices, and vehicles of any of FIGS. 1-11 and 13-18 may be referred to where relevant.

So returning now to the lateral alignment process, process 1200 may include the inquiry "alignment ambiguous" 1202, which is the same operation 310 (FIG. 3) and operation 410 (FIG. 4). In the event of the best alignment hypotheses being ambiguous, the system herein attempts to resolve the ambiguity by using a multi-stage ambiguity process, where each stage uses a different ambiguity test. By one form a three-stage robust ambiguity resolution algorithm is performed when an ambiguity results from the lateral alignment process 400 described above, and this may occur when the system detects two or more potential alignment candidate perception lane edges for a single map lane edge, or vice-versa. By one form, the ambiguity is resolved by having at least one or two stages computing and aggregating probability or individual alignment scores through a non-ambiguity counter. By an alternative form, all stages may use a non-ambiguity counter. By the following three stage process, the second and third stages use the non-ambiguity counter as follows.

Specifically, process 1200 may include "perform decoupling" 1204, and performed by decoupling unit 232. This first stage involves decoupling (or filtering or ignoring) low likelihood contributions and recalculating the alignment hypotheses to generate an updated group probability score or scores. Thus, this first stage limits the focus to high likelihood individual alignments. This is performed by process 1300.

Figure 13:
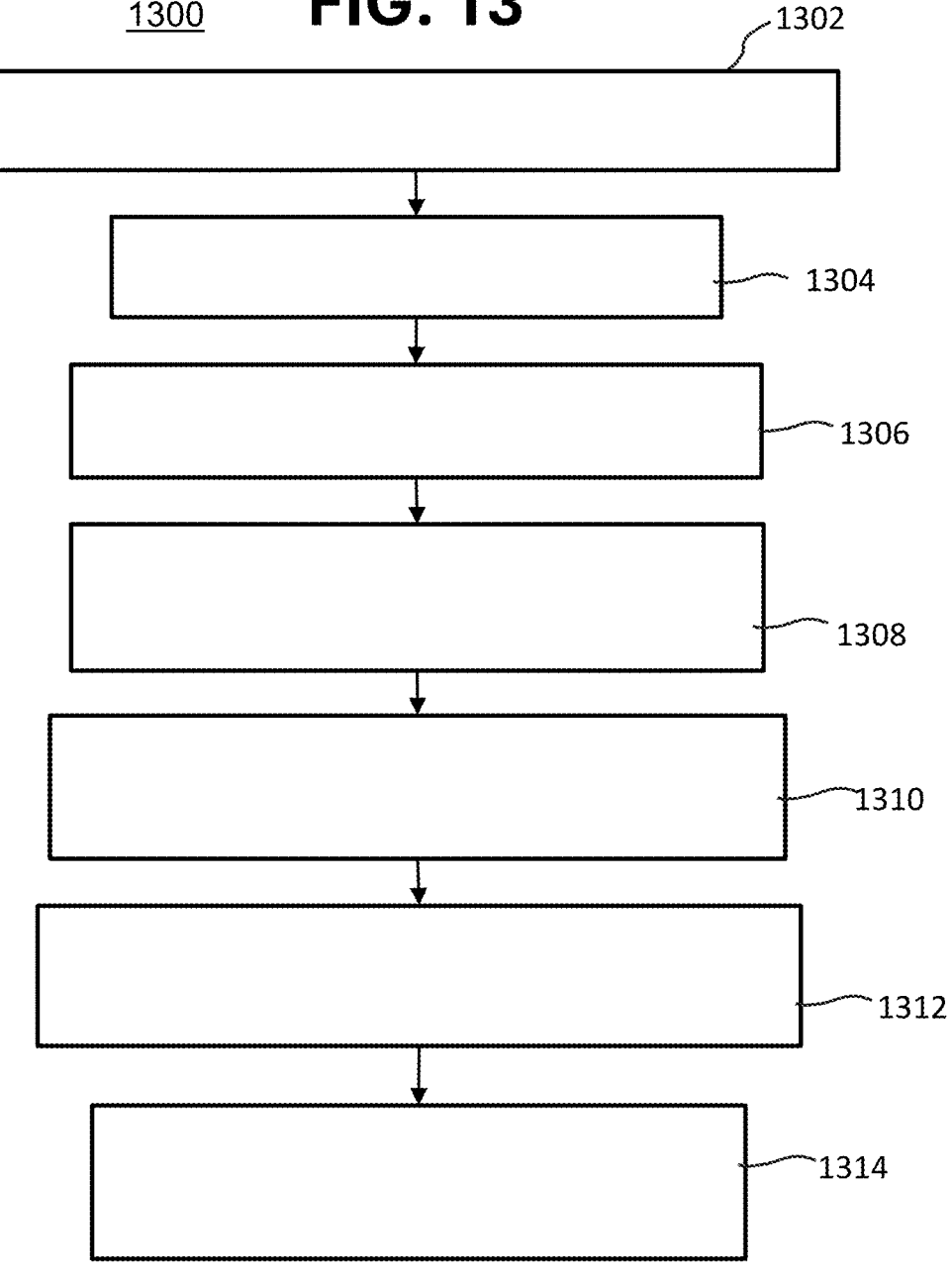
FIG. 13 is a flow chart of an example first stage ambiguity resolution of the method of FIG. 12 according to at least one of the implementations herein.

Referring to FIG. 13, a process 1300 of performing a low likelihood decoupling ambiguity stage for perception-map association is provided according to at least one of the implementations described herein. The process 1300 is described with operations 1302-1314 generally numbered evenly. The systems, roadways setups, processes, devices, and vehicles of any of FIGS. 1-12 and 14-18 may be referred to where relevant.

Process 1300 may include "for each group alignment, compare individual alignment likelihoods to an individual alignment threshold" 1302. This individual alignment threshold is determined by experimentation and defines the difference between low and high (and/or non-low) individual alignment likelihood. This is the l(pi, mj) values from equation (1) above.

Process 1300 may include "remove individual alignments below the individual alignment threshold" 1304, where those individual alignments with individual alignment likelihoods l(pi, mj) below the threshold are now removed or ignored.

Process 1300 may include "recompute individual alignment likelihoods and group alignment probability scores" 1306. This involves performing equation (1) without the individual alignments with low likelihoods to recompute the group alignment L(i, j) of equation (1). This may be repeated for each group alignment or a certain subset of them that are to be used.

Process 1300 may include "compare recomputed group alignment probability scores to a group alignment threshold" 1308. This group alignment threshold for this ambiguity stage also is determined by experimentation. It should be noted that the group alignment threshold here may be used instead of the ratio threshold that may be the same or similar threshold as the ambiguity threshold of any of operation 310 (FIG. 3), operation 410 (FIG. 4), and operation 1202 (FIG. 12). Otherwise, both thresholds may be used as is mentioned here for this first ambiguity stage.

Process 1300 may include "form group alignment probability score ratios with two highest probability scores of two group alignments" 1310, and the top two probability scores are placed in a ratio as described above with lateral alignment operation 410. It will be appreciated that alternatives could be used instead to form the ratios as long as relative performance among the group alignments may be rated.

As mentioned by one possible alternative, the ratios may be compared to a ratio threshold, and only those group alignments with a ratio higher than the ratio threshold will be considered any further. This may be in addition to, or instead of, the group alignment threshold mentioned above.

Process 1300 may include "use the group alignment with the highest probability score of the highest ratio as the "resolved alignment" 1312, and only those that satisfied the ratio threshold when being used, as mentioned. This is designated as resolved 1214 on process 1200 (FIG. 12). When the ratio threshold is used here to approve the resolved alignment, this indicates the resolved alignment is sufficiently aligned between perception and map lanes, and as explained above.

Process 1300 may include "if no group alignment has a probability score above the group alignment threshold, then continue with stage 2" 1314. Also, this may refer to the ratio threshold instead, or by an alternative, both the group alignment and ratio thresholds must be satisfied.

Figure 14:
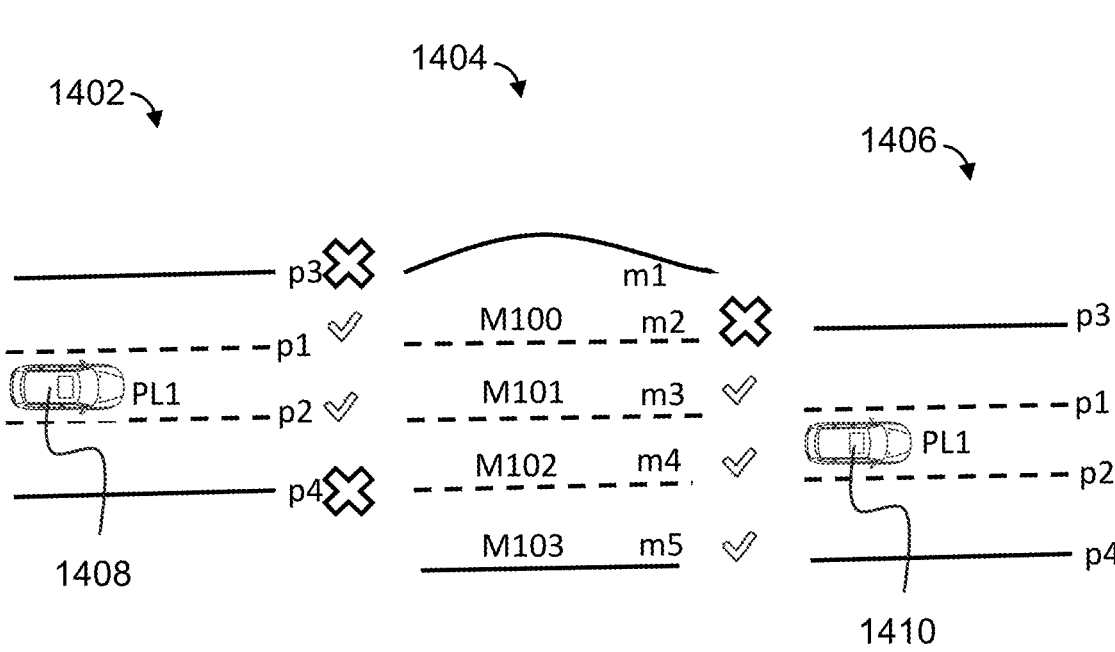
FIG. 14 is a schematic diagram of an example roadway segment showing ambiguity resolution in the first stage of FIG. 13 according to at least one of the implementations herein.

Referring to FIG. 14 as an example, a roadway segment or setup 1400 is similar to roadway segment 800, and is designated similarly. Here, however, the 'X' shows those individual alignments that were dropped or ignored. Thus, a low likelihood may exist which may have resulted from the match of lane edges p1 to m4 due to the lane type, and lane edges p1 to m1 due to the lane curvature. Also, the individual alignment of p3 to m1 was dropped due to curvature as well. These individual alignments are then removed from equation (1) before recomputing a group alignment probability score.

Returning to process 1200 that may include "perform ego lane tracking" 1206, and as performed by an ego lane tracking unit 234. This is provided by process 1500.

Figure 15:
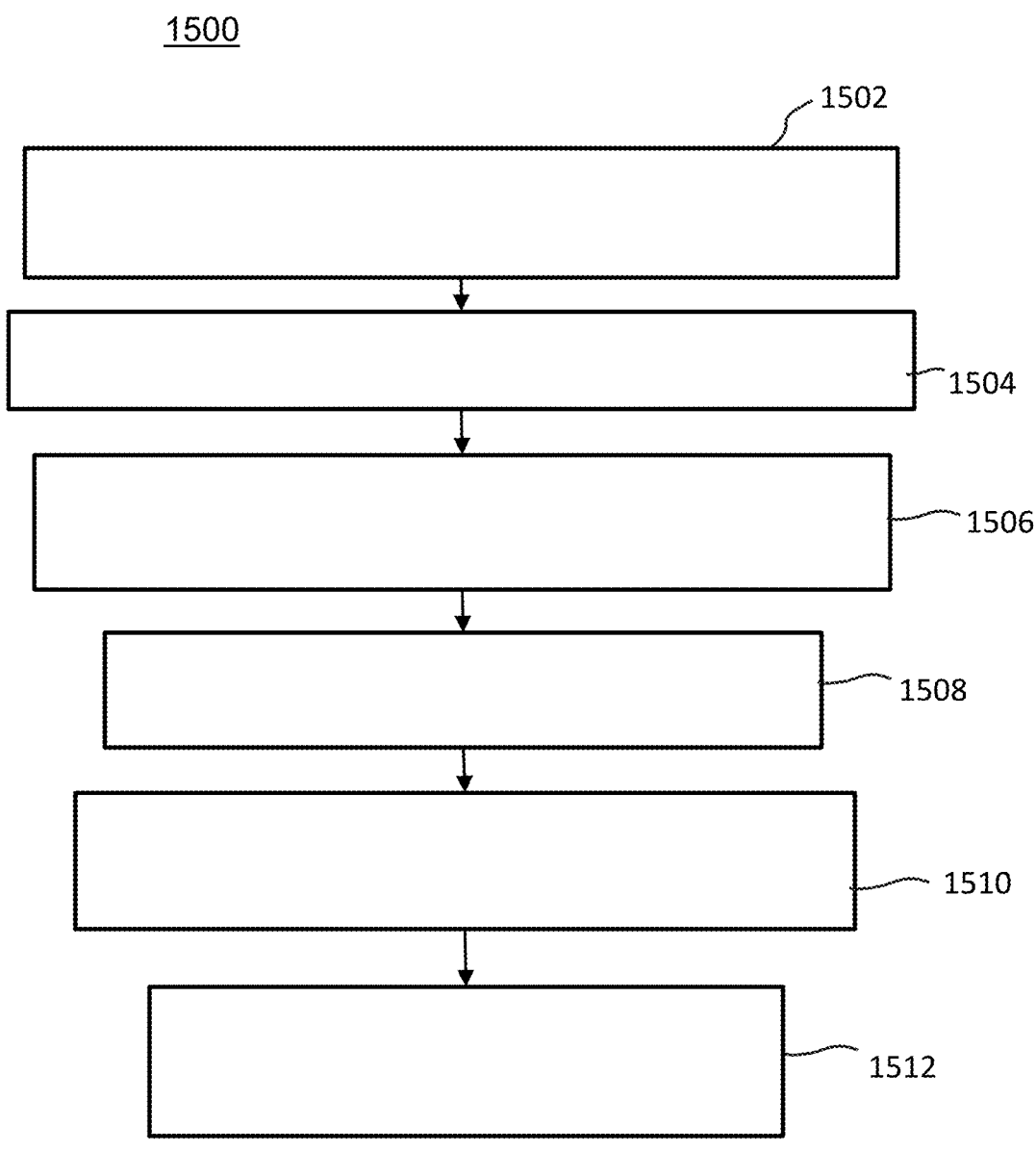
FIG. 15 is a flow chart of an example second stage ambiguity resolution of the method of FIG. 12 according to at least one of the implementations herein.

Referring to FIG. 15, a process 1500 of performing an ego lane tracking ambiguity stage for perception-map association is provided according to at least one of the implementations described herein. The process 1500 is described with operations 1502-1512 generally numbered evenly. The systems, roadways setups, processes, devices, and vehicles of any of FIGS. 1-14 and 16-18 may be referred to where relevant.

Process 1500 may include "for each group alignment, obtain data of the current ego lane alignments between perception and map lane edges of the current roadway segment forming the individual alignments" 1502. Specifically, the second stage involves tracking lane edge association history and focuses on the previous (or prior timestamp) ego lane edges of a previous roadway segment and the configuration of the perception and/or map lane edges that form the previous associations. It should be noted that the timestamp has any suitable format or numbering of maps and perception images of such maps and perception images in a sequence. Also, precious and current may refer to roadway segments that are previous and subsequent relative to each other and may or may not overlap, or the previous and current maps and perception images are of the same roadway segment at different times (or different time-stamps). An ego lane edge refers to a right or left edge of a lane being driven on by the host vehicle. In other words, the closest lane edges to the vehicle. By alternative approaches, more lane edges could be added such as the lane edges of the closest left and right lanes to the host lane.

Process 1500 may include "determine final previous individual associations of previous roadway segment corresponding to current ego lane alignments" 1504. Thus, the individual associations refer to final determinations versus the individual alignments of the current roadway segment which are alignments still being analyzed. Otherwise, the individual associations also refer to a match (or now association) between a single perception lane edge and a single map lane edge, as with the individual alignments. The previous associations also may be referred to as previous timestamp ego associations.

Process 1500 may include "compare the previous individual associations to the corresponding, current ego lane individual alignments, one group alignment at a time" 1506. This involves determining whether a pair of an individual previous association and an individual alignment matches the same perception and map lane edges. In one particular example, an ambiguity (or ambiguous) individual alignment is determined and has a likelihood computed. The ambiguity (or ambiguous) individual alignment computation is performed between a perception lane edge of the current roadway segment and a current map lane edge of the current roadway segment. The likelihood for the current alignment is then compared to the likelihood of the previous ego timestamp (individual) association. These comparisons are performed between alignment and association with the same identifier (for example, the same lane identifier such as the same lane number, same lane (edge or ego) number or letter, etc.). It will be appreciated that alternative operations may be used instead to compare the historical data.

Figure 16:
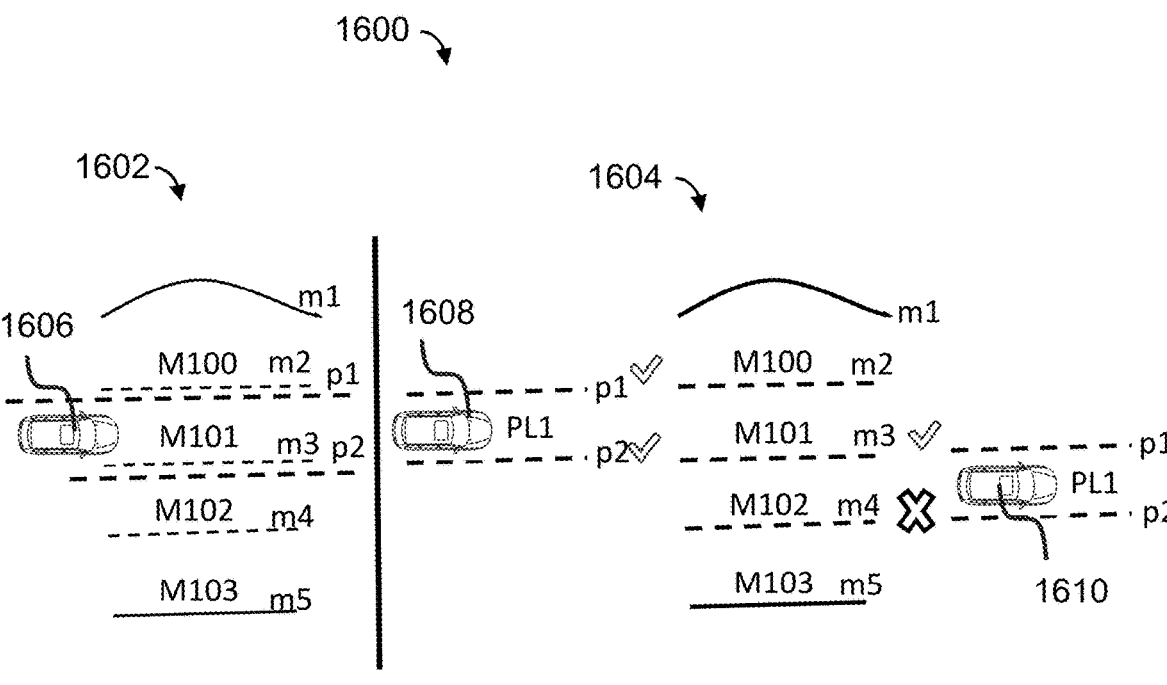
FIG. 16 is a schematic diagram of an example roadway segment showing ambiguity resolution in the second stage of FIG. 15 according to at least one of the implementations herein.

Referring to FIG. 16 for this example, roadway setup 1600 has a previous association or roadway segment 1602 with a host vehicle 1606 on a four lane, previous roadway segment with map lanes M100 to M103 defined by previous map lane edges m1 to m5, where m2 and m3 are the map ego lanes for the vehicle 1606. Previous lane edges p1 and p2 (or just previous edges p1 and p2) of host lane PL1 are the perception ego lane edges for the host vehicle 1606 on the previous roadway segment 1602.

Comparing the previous associations of perception lane edges p1 and p2 from lane PL1 to the current alignment candidates 1604 shows that respective matches occurring between perception lane edges p1 and p2 previously associated with map lane edges m2 and m3 are adequate for the current alignment candidate map lane edges m2 and m3. Alternatively, when comparing the perception lane edges p1 and p2 previously associated with map lane edges m2 and m3 to another current alignment candidate using map lane edges m3 and m4, only one of the matches is adequate (p1-m3). These comparisons are shown below on tables 1 and 2.

TABLE 1

| Previous Association |
| --- |
| P1 -> m2 |
| P2 -> m3 |

TABLE 2

| Map Lane Candidate | Ambiguity Count |
| --- | --- |
| m2 and m3 (M101) | 2 |
| m3 and m4 (M102) | 1 |

Process 1500 may include "for each comparison above a match threshold, increase a non-ambiguity counter by one" 1508, and this is performed for each ambiguity individual alignment in a group alignment (or in other words, in the ambiguous group alignment formed for the ambiguity stage). Thus, the comparison on the left with the host vehicle identified as 1608 for comparison for m2 and m3 (M101) has two adequate likelihoods, and therefore receives two non-ambiguity counts, one per lane line, or one per ambiguity individual alignment. The comparison on the right with the host vehicle identified as 1610 with m3 and m4 (M102) only has one individual alignment with an adequate likelihood so only receives a single non-ambiguity count, as shown on table 2. This shows the lane edge association is more likely to tend or stay over time as shown on the arrangement with the comparison of vehicle 1608 and the previous roadway segment 1602.

Process 1500 may include "if a group alignment has the highest non-ambiguity count, then use that group alignment as the resolved alignment" 1510. Thus, in this example of FIG. 16 with the group alignment with the higher non-ambiguity count for m2 and m3 (M101), the lateral map bias correction may be determined and provided to finalize the map bias correction as described above with process 300. The resolved alignment is designated as resolved 1216 on process 1200 (FIG. 12). Otherwise, process 1500 may include "if all group alignments have the same non-ambiguity count, then go to stage 3" 1512.

Process 1200 then may include "determine ego lane feature consistency" 1208, and this may be performed by the ego lane feature consistency unit 236.

Referring to FIG. 17, a process 1700 of performing an ego lane feature consistency ambiguity stage for perception-map association is provided according to at least one of the implementations described herein. The process 1700 is described with operations 1702-1710 generally numbered evenly. The systems, roadways, setups, processes, devices, and vehicles of any of FIGS. 1-16 and 18 may be referred to where relevant.

Process 1700 may include "for each group alignment, for each individual likelihood in the group alignment, and for each feature likelihood in an individual alignment, determine a feature likelihood between features of a previous individual association and a current individual alignment" 1702. This may include establishing the same ambiguity individual alignment between previous features of previous perception lane edges of the previous roadway segment and current features of current map lane edges of the current roadway segment. Here, the historical data being analyzed or monitored is the consistency of the edge features themselves over time. The equation (2) above may be used to determine the feature match likelihoods, although other alternative algorithms could be used instead.

Process 1700 may include "compare the feature likelihoods to at least one feature threshold" 1704. The feature likelihoods are then compared to feature thresholds to determine if the feature matches are sufficiently close. Each different feature type may have its own threshold determined by experimentation. If the previous features change significantly from one previous time (k) to now time (k+1), that indicates a change in the alignment from previous roadway segment to current roadway segment that should be factored. Otherwise, if the features are consistent over time, then it should be more acceptable to still use those same alignments or associations.

Process 1700 may include "for each individual alignment satisfying the feature threshold for all or multiple features, increase a non-ambiguity counter by one" 1706. Thus, by one example form, when an ambiguity individual alignment has all likelihoods of all feature matches between the previous perception lane edges and the current map lane edges higher than their feature thresholds, then the individual alignment is satisfactory. In this case, where the perception lane edges and map lane edges are sufficiently similar or the same, the non-ambiguous count may be incremented up by one for each such ambiguity individual alignment in a group alignment.

Process 1700 may include "use the group alignment with a highest non-ambiguity count as the resolved alignment" 1708, and this may be determined by the candidate selection unit 238. Thus, the map lane edge with the highest ambiguity count is chosen as having the most consistent lane features. This corresponds to operation 1206 and the resolved alignment designation resolved 1218 (FIG. 12).

Figure 18:
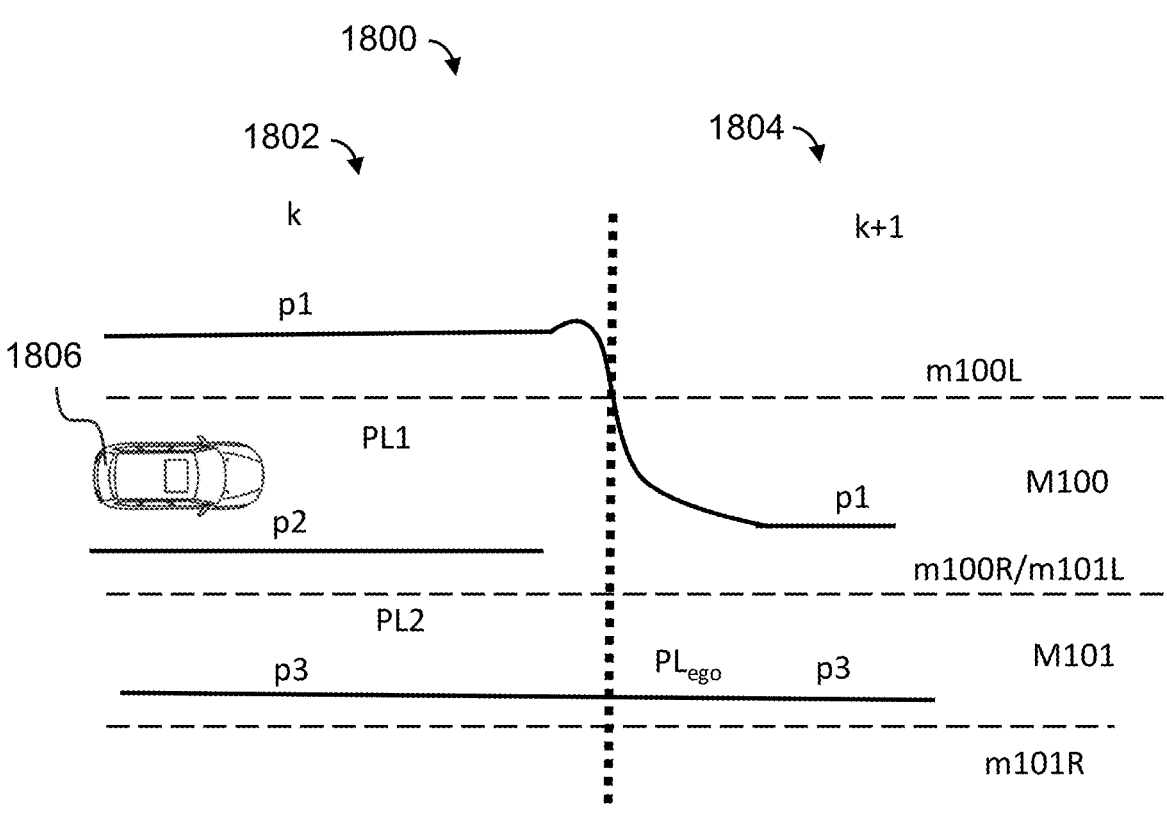
FIG. 18 is a schematic diagram of an example roadway segment showing ambiguity resolution in the third stage of FIG. 17 according to at least one of the implementations herein.

Referring to FIG. 18 as an example for feature consistency, a roadway setup 1800 has a previous roadway segment 1802 at time k next to a subsequent, current roadway segment 1804 at time k+1. Perception and map lane edges are shown to cross from one roadway segment 1802 to the next roadway segment 1804. The perception lane edges include lane lines p1, p2, and p3 defining previous perception lanes PL1 and PL2, while the map lane edges include lane lines m100, m100R/m100L, and m101R that define current lanes M100 and M101 as indicated by the lane line names, where R stands for right and L stands for left. A host vehicle 1806 is in the center lane PL1. As shown, the perception lane edge p1 curves inward or downward indicating there may have been a perceived reduction from two to one lane, and indicating a change in the features from the previous to current roadway segment. In contrast, the map lane edges remain straight in both segments thereby causing a map bias. The edge associations and non-ambiguity counts are shown on tables 3 and 4 below.

In this case, p3 is found to have consistent features into lane M101 at time k+1, while p1 does not have consistent features due to the changing curvature feature and will have a low feature match likelihood that does not meet feature matching thresholds. In this case, both edges of the M101 lane may receive an incremented non-ambiguity count for map edges m101R and m100R/m101L even though p2 lane line may stop and p1 actually become the lane line for lane M101. Otherwise, edge p1 does not receive an increment to the non-ambiguity count for lane M100. Thus, the group alignments that match p1 to m100L will not have the highest non-ambiguity count. Those group alignments with p3 paired to m101R without pairing p1 to map edge m100L will have the higher non-ambiguity score.

TABLE 3

| Perception Edges at k | Associated Map Edges |
|---|---|
| p1 | M100L |
| p2 | M100R/M101L |
| P3 | M101R |

TABLE 4

| Map Lane Candidate | Ambiguity Count |
|---|---|
| M100 | 2 |
| M101 | 1 -> 2 |

Process 1700 may include "if no feature correspondence satisfies the feature thresholds, then use the group alignment with the highest probability score" 1710. This corresponds to operation 1210 of process 1200 (FIG. 12). Thus, if no individual alignment has all feature matches with likelihoods that satisfy the feature thresholds, then use the group alignment with the highest probability score. This may of the original group alignments being analyzed, updated ambiguity group alignments formed of ambiguity group individual alignments analyzed, or a combination of both.

Process 1200 then performs "provide resolved association" 1212 which returns the process 1200 to operation 312.

While at least one example implementation has been presented in the foregoing detailed description, it should be appreciated that a vast number of variations exist. It should also be appreciated that the example implementations are not intended to limit the scope, applicability, or configuration of the disclosure in any way. Rather, the foregoing detailed description will provide those skilled in the art with a convenient road map for implementing the example implementations. It should be understood that various changes may be made in the function and arrangement of elements without departing from the scope of the disclosure as set forth in the appended claims and the legal equivalents thereof.

What is claimed is:

1. A method, comprising:
 receiving map data comprising a plurality of map lane edges of a roadway segment;
 receiving perception data comprising a plurality of perception lane edges of the roadway segment;
 forming at least one alignment having at least one of the map lane edges and at least one of the perception lane edges;
 determining, by at least one processor, a probability score of each of the alignments that indicates whether at least one of the map lane edges of the alignment is to be the same lane line as one of the perception lane edges of the alignment;
 resolving an ambiguity, by at least one processor, when no probability score of the at least one alignment satisfies at least one alignment criterion, and comprising determining a resolved alignment between the at least one perception lane edge and the at least one map lane edge comprising applying multiple ambiguity stages, wherein each ambiguity stage has a different ambiguity test, and wherein at least two of the ambiguity stages are arranged to determine whether to increment a non-ambiguity count depending on a magnitude of likelihoods related to the at least one alignment, and
 determining, by at least one processor, the resolved alignment exists when the alignment between the at least one perception lane edge and the at least one map lane edge has a highest non-ambiguity count.

2. The method of claim 1, wherein the alignment is a group alignment with one or more individual alignments, wherein each individual alignment has a perception lane edge paired to a map lane edge, and wherein the multiple ambiguity stages include, in order, a first low likelihood decoupling stage that is arranged to remove individual alignments with low likelihoods, a second ego lane tracking stage that factors previous individual associations between map and perception lane edges, and a third ego lane feature consistency stage that matches lane features of the individual alignments to lane features of the previous individual associations.

3. The method of claim 1, wherein the alignment is a group alignment with one or more individual alignments, wherein each individual alignment has a perception lane edge paired to a map lane edge, and wherein one of the ambiguity stages is a low likelihood decoupling stage that ignores individual alignments each with an individual likelihood that is below an individual alignment ambiguity threshold, and ignored to compute the probability score of a group alignment.

4. The method of claim 1, wherein the roadway segment is a current segment, and wherein one of the ambiguity stages is an ego lane tracking stage that comprises generating ambiguous group alignments each with one or more ambiguous individual alignments; and determining whether a current ego individual alignment of a map and perception lane edge is sufficiently similar to a previous timestamp ego map and ego perception lane edge of a previous ego association and at least partly based on an identifier that is temporally consistent in the current ego individual alignment and the previous ego association.

5. The method of claim 4, wherein the non-ambiguity count is incremented for each of the ego individual alignments with a sufficient match between a current map and perception lane edge with a previous map and perception lane edge association.

6. The method of claim 1, wherein the roadway segment is a current segment, and wherein one of the ambiguity stages is an ego lane feature consistency stage that determines likelihoods of feature matches between lane line features of a current map or perception lane edge of the current time stamp with a corresponding previous map or perception edge so that each pair of current and previous map and perception lane edges forms an ambiguity individual alignment, and wherein the determining of likelihoods of feature matches is repeated for each ambiguity individual alignment of an ambiguity group alignment with multiple ambiguity individual alignments.

7. The method of claim 6, wherein the non-ambiguity count is incremented when an ambiguity individual alignment has multiple features each with a feature match likelihood that is over a feature match threshold.

8. The method of claim 6, wherein the features include at least one of: lane type, lane color, lane curvature, and lane heading.

9. The method of claim 6, wherein distance between perception and map lane edges is not one of the features.

10. A system, comprising:
memory; and
processor circuitry forming at least one processor communicatively coupled to the memory and being arranged to operate by:
receiving map data comprising a plurality of map lane edges of a roadway segment,
receiving perception data comprising a plurality of perception lane edges of the roadway segment,
forming at least one alignment having at least one of the map lane edges and at least one of the perception lane edges;
determining a probability score of each of the alignments that indicates whether at least one of the map lane edges of the alignment is to be the same lane line as one of the perception lane edges of the alignment,
resolving an ambiguity when no probability score of the at least one alignment satisfies at least one alignment criterion, and comprising determining a resolved alignment between the at least one perception lane edge and the at least one map lane edge comprising applying multiple ambiguity stages, wherein each ambiguity stage has a different ambiguity test, and wherein at least two of the ambiguity stages are arranged to determine whether to increment a non-ambiguity count depending on a magnitude of likelihoods related to the at least one alignment, and
determining the resolved alignment exists when the alignment between the at least one perception lane edge and the at least one map lane edge has a highest non-ambiguity count.

11. The system of claim 10, wherein the alignment is a group alignment with one or more individual alignments each having a map lane edge paired with a perception lane edge, and wherein the at least one processor is arranged to operate by generating multiple alternative group alignments each with individual alignments with differently paired map and perception lane edges from group alignment to group alignment; and generating a probability score for each alternative group alignment.

12. The system of claim 11, wherein generating the multiple alternative group alignments comprises maintaining map lane edges in an arrangement relative to each other in a map, maintaining perception lane edges in an arrangement relative to each other in a perception image, and moving the map relative to the perception image to change the map and perception lane edge pairs in the individual alignments from group alignment to group alignment.

13. The system of claim 11, wherein determining the probability score comprises forming a likelihood for each individual alignment comprising factoring one or more feature match likelihoods of lane line features without factoring distance between map and perception lane edges.

14. The system of claim 13, wherein the probability score factors at least one feature of: lane type, lane color, lane curvature, and lane heading to generate a selected best group alignment, and wherein the at least one processor is arranged to operate by determining a bias correction of the selected best group alignment comprising factoring distance between at least one map lane edge and at least one perception lane edge of the selected best group alignment.

15. The system of claim 11, wherein the at least one processor is arranged to operate by applying a confidence value to a likelihood of each individual alignment to generate the probability score of the group alignment.

16. The system of claim 11, wherein the at least one processor is arranged to operate by determining which group alignment among multiple alternative group alignments has a best alignment between map and perception lane edges comprising determining whether a ratio with two highest probability scores is over a threshold.

17. A vehicle, comprising:
memory; and
processor circuitry forming at least one processor communicatively coupled to the memory and being arranged to operate by:
receiving map data comprising a plurality of map lane edges of a roadway segment,
receiving perception data comprising a plurality of perception lane edges of the roadway segment, forming at least one alignment having at least one of the map lane edges and at least one of the perception lane edges;

determining a probability score of each of the alignments that indicates whether at least one of the map lane edges of the alignment is to be the same lane line as one of the perception lane edges of the alignment, resolving an ambiguity when no probability score of the at least one alignment satisfies at least one alignment criterion, and comprising determining a resolved alignment between the at least one perception lane edge and the at least one map lane edge comprising applying multiple ambiguity stages, wherein each ambiguity stage has a different ambiguity test, and wherein at least two of the ambiguity stages are arranged to determine whether to increment a non-ambiguity count depending on a magnitude of likelihoods related to the at least one alignment, and determining the resolved alignment exists when the alignment between the at least one perception lane edge and the at least one map lane edge has a highest non-ambiguity count.

18. The vehicle of claim 17, wherein the at least one processor is arranged to operate by: determining map and perception non-lane objects on and near the roadway segment including segments before or after or both of the roadway segment, and computing a group longitudinal map bias comprising factoring distances between map and perception non-lane objects of multiple pairs, and applying the group longitudinal map bias to adjust map or perception lane edge positions of the map or perception data.

19. The vehicle of claim 18, wherein the at least one processor is arranged to operate by combining the group longitudinal map bias and a lateral map bias determined by using the probability score and the resolved alignment to form a map bias correction, and applying the map bias correction to generate a group association between map lane edges and perception lane edges while factoring distance as a lane feature.

20. The vehicle of claim 19, wherein the at least one processor is arranged to operate by using the group association to provide a previous association to be used in a future ambiguity stage.

* * * * *